United States Patent
Jenks et al.

(10) Patent No.: US 12,309,186 B2
(45) Date of Patent: May 20, 2025

(54) SYSTEMS AND METHODS FOR CONTINUOUS THREAT-INFORMED EXPOSURE MANAGEMENT

(71) Applicant: Cyberproof Inc., Aliso Viejo, CA (US)

(72) Inventors: Michael Jenks, Charleston, SC (US); Nick Lantuh, Bethesda, MD (US); Michael Maurer, Mount Pleasant, SC (US); Ian Roth, Charleston, SC (US); Fred Wilmot, Seattle, WA (US)

(73) Assignee: Cyberproof Inc., Aliso Viejo, CA (US)

( * ) Notice: Subject to any disclaimer, the term of this patent is extended or adjusted under 35 U.S.C. 154(b) by 0 days.

(21) Appl. No.: 18/498,030

(22) Filed: Oct. 30, 2023

(65) Prior Publication Data

US 2024/0314153 A1 Sep. 19, 2024

Related U.S. Application Data

(63) Continuation of application No. 18/184,922, filed on Mar. 16, 2023, now Pat. No. 11,805,145.

(60) Provisional application No. 63/320,539, filed on Mar. 16, 2022.

(51) Int. Cl.
  *H04L 9/40* (2022.01)
  *G06N 20/00* (2019.01)

(52) U.S. Cl.
  CPC ...... *H04L 63/1425* (2013.01); *H04L 63/1433* (2013.01); *G06N 20/00* (2019.01)

(58) Field of Classification Search
  CPC .. H04L 63/1425; H04L 63/1433; G06N 20/00
  See application file for complete search history.

(56) References Cited

U.S. PATENT DOCUMENTS

| | | | |
|---|---|---|---|
| 11,019,076 B1 * | 5/2021 | Jakobsson | H04L 51/42 |
| 11,805,145 B2 * | 10/2023 | Jenks | H04L 63/1425 |
| 11,924,244 B2 * | 3/2024 | Lantuh | H04L 63/029 |
| 2005/0160286 A1 * | 7/2005 | Currie | H04L 63/1433 |
| | | | 726/22 |
| 2008/0189788 A1 * | 8/2008 | Bahl | H04L 63/1416 |
| | | | 726/25 |
| 2017/0331840 A1 * | 11/2017 | Ranjan | G06F 21/50 |
| 2019/0138512 A1 * | 5/2019 | Pourmohammad | |
| | | | G06Q 10/0635 |
| 2020/0089887 A1 * | 3/2020 | Luthra | G06F 21/577 |
| 2020/0097662 A1 * | 3/2020 | Hufsmith | H04L 9/0643 |

(Continued)

FOREIGN PATENT DOCUMENTS

| | | | | |
|---|---|---|---|---|
| CA | 3058665 A1 * | 5/2020 | ......... | G06K 9/00483 |
| CN | 111611294 A * | 9/2020 | ......... | G06F 16/2462 |
| WO | WO-2020037244 A1 * | 2/2020 | ............. | G06N 20/00 |

*Primary Examiner* — Sarah Su
(74) *Attorney, Agent, or Firm* — Paul D. Bianco; Fleit Intellectual Property Law

(57) ABSTRACT

Aspects of the subject technology relate to determining a defense surface change command to be applied to a defense surface. An organizational threat profile is stored and a baseline exposure score for threats is generated. The baseline exposure score is weighted based on at least the organizational threat profile to generate a prioritized exposure score. A defense surface change command is generated based on at least the prioritized exposure score, which is transmitted to hardware or software components, and an updated prioritized exposure score for the one or more hardware or software components is generated.

20 Claims, 13 Drawing Sheets

(56) References Cited

U.S. PATENT DOCUMENTS

| | | |
|---|---|---|
| 2020/0382547 A1* | 12/2020 | Basballe Sorensen ..................... H04L 63/1433 |
| 2020/0387833 A1* | 12/2020 | Kursun .................. G06N 20/20 |
| 2021/0168166 A1* | 6/2021 | Liu ........................ G06N 20/20 |
| 2022/0129560 A1* | 4/2022 | Bulut .................... G06F 21/577 |
| 2022/0188450 A1* | 6/2022 | Singh ...................... G06F 21/46 |
| 2022/0345457 A1* | 10/2022 | Jeffords .............. G06F 21/6218 |
| 2023/0129649 A1* | 4/2023 | Kalwani .............. G06T 15/005 345/419 |

* cited by examiner

SYSTEMS AND METHODS FOR CONTINUOUS THREAT-INFORMED EXPOSURE MANAGEMENT

CROSS REFERENCE TO RELATED APPLICATION

This application is a continuation of application Ser. No. 18/184,922, filed Mar. 16, 2023, which claims the benefit of U.S. Provisional Patent Application No. 63/320,539, filed Mar. 16, 2022, the contents of each of which are incorporated by reference in their entirety herein.

TECHNICAL FIELD

The present application generally relates to the field of information security, including methods and apparatus for monitoring a cyber defense environment to provide prioritized threat evaluation and defense surface response, according to an embodiment.

BACKGROUND

Known compute devices and applications used by cyber security operation teams (e.g., in an enterprise organization) struggle to stay aware of updates in mitigations, telemetry data, detection logics available to them and to prioritize actions by threat exposure to the defended environment's security posture. Therefore, a need exists for improved systems and methods for cyber security operations in cyber threat environments and monitoring a cyber defense environment for prioritized security management.

SUMMARY

In various embodiments, a computer-implemented method, computing device, and computer-readable storage media are disclosed. Example embodiments for determining a defense surface change command to be applied to a defense surface include a computer-implemented method, computing device, and computer-readable storage media for storing threat information for a set of known threats in an adversarial technique framework data structure, wherein the stored threat information comprises one or more of adversarial tactics, techniques, and procedure information; storing an organizational threat profile, the threat profile comprising information about networked components forming part of a network infrastructure, and wherein the networked components comprise one or more hardware or software components for monitoring a security state on a computer network; generating baseline exposure scores for the set of known threats; weighting the baseline exposure scores for the set of known threats based on at least the organizational threat profile to generate a prioritized exposure score for the threats in the set of known threats; determining one or more defense surface change commands based on at least the prioritized exposure scores for the threats in the set of known threats; transmitting the one or more defense surface change commands to the one or more hardware or software components based on the prioritized exposure scores for the threats in the set of known threats; receiving confirmation of a defense surface change at the one or more hardware or software components in response to the one or more defense surface change commands; and generating an updated prioritized exposure score for the one or more of the known threats.

Example further embodiments can include training a machine learning model based on a set of historical telemetry data received from the networked components and a set of historical threat information; receiving subsequent telemetry data from the networked components and subsequent threat information; and executing the machine learning model based on the subsequent telemetry data and the subsequent threat information to predict an occurrence of a subsequent threat and a prioritized exposure score for the subsequent threat.

Example further embodiments can include receiving the organizational threat profile; generating a prioritized threat model score; generating a prioritized defense surface score; generating a prioritized fleet exposure score; receiving the prioritized threat model score, the prioritized defense surface score, and the prioritized fleet exposure score as inputs to a modeling engine; applying one or more weighting factors to one or more of the inputs to the modeling engine; and generating by the modeling engine the prioritized exposure score based on one or more of the inputs to the modeling engine.

Example further embodiments can include generating the prioritized defense surface score based on one or more terrain parameters selected from one or more of: a toolset configuration, a security log, an implemented detection logic, a security control or policy, and available detection logic.

Example further embodiments can include determining one or more defense surface change commands by storing a set of defense surface change commands mapped for association with the set of known threats and a set of telemetry data; mapping the stored threat information for the set of known threats against a set of received telemetry data to identify one or more security coverage gaps; and determining the one or more defense surface change commands based on the one or more identified security coverage gaps.

Example further embodiments can include generating the organizational threat profile based on one or more of: a relevance to an organization, an ability of a threat to be used within an organization environment, a country in which the organization operates, an industry in which the organization operates, a number of employees in the organization, a defense surface platform within a defended environment at the organization, and a type of data managed by the organization.

Example further embodiments can include receiving a set of telemetry data from one or more networked components forming part of a network infrastructure, wherein the telemetry data comprises one or more sets of log data and configuration data.

In example further embodiments, the baseline exposure scores can apply to multiple enterprises and further comprise generating the baseline exposure scores based on one or more of a prevalence, impact, usability, and actionability value.

DETAILED DESCRIPTION

Non-limiting examples of various aspects and variations of the embodiments are described herein and illustrated in the accompanying drawings.

In cyber defense environments (e.g., cyber defense environment of an enterprise organization), cyber security teams often struggle to maintain an awareness of mitigations, telemetry and detection logic available to them that can be leveraged to best defend the defense environment from adversarial threat actors. Moreover, it is a challenge to prioritize threat exposure information. As used herein, threat exposure information can include, as non-limiting examples, any combination of adversarial techniques, adversarial software, adversarial groups, assets, vulnerabilities, response to and awareness of mitigations or threat exposure response actions, telemetry data, and detection logic coverage. As used herein, adversarial techniques can include adversarial techniques leveraged by adversaries (also referred to herein as "adversarial techniques" or "adversarial technique identities"), software leveraged by adversaries (also referred to herein as "adversarial software" or "adversarial software identities"), adversarial groups leveraging the adversarial techniques and adversarial software (also referred to herein at "adversarial groups" or "adversarial group identities"). Mitigations can be implemented to eliminate identified threats in substantially real-time (also referred to herein as "mitigations"; e.g., 100 milliseconds, 500 milliseconds, 1 second, 5 seconds, 10 seconds, 50 seconds, 100 seconds, 500 seconds, and/or the like), other telemetry data that can be collected and/or used to monitor an adversarial technique(s), and/or other detection logic that be created and/or used to detect an adversarial technique(s).

Accordingly, the awareness and prioritization engines and methods described herein provide fast and reliable situational awareness and prioritizations of cyber security operations in cyber threat environments. Therefore, the one or more awareness and prioritization engines described herein can improve situational awareness in an organization and/or prioritize cyber defense decisions, support actions, and/or remedial actions in a technical fashion and at machine speed.

Continuous Threat Exposure Management

Figure 1:
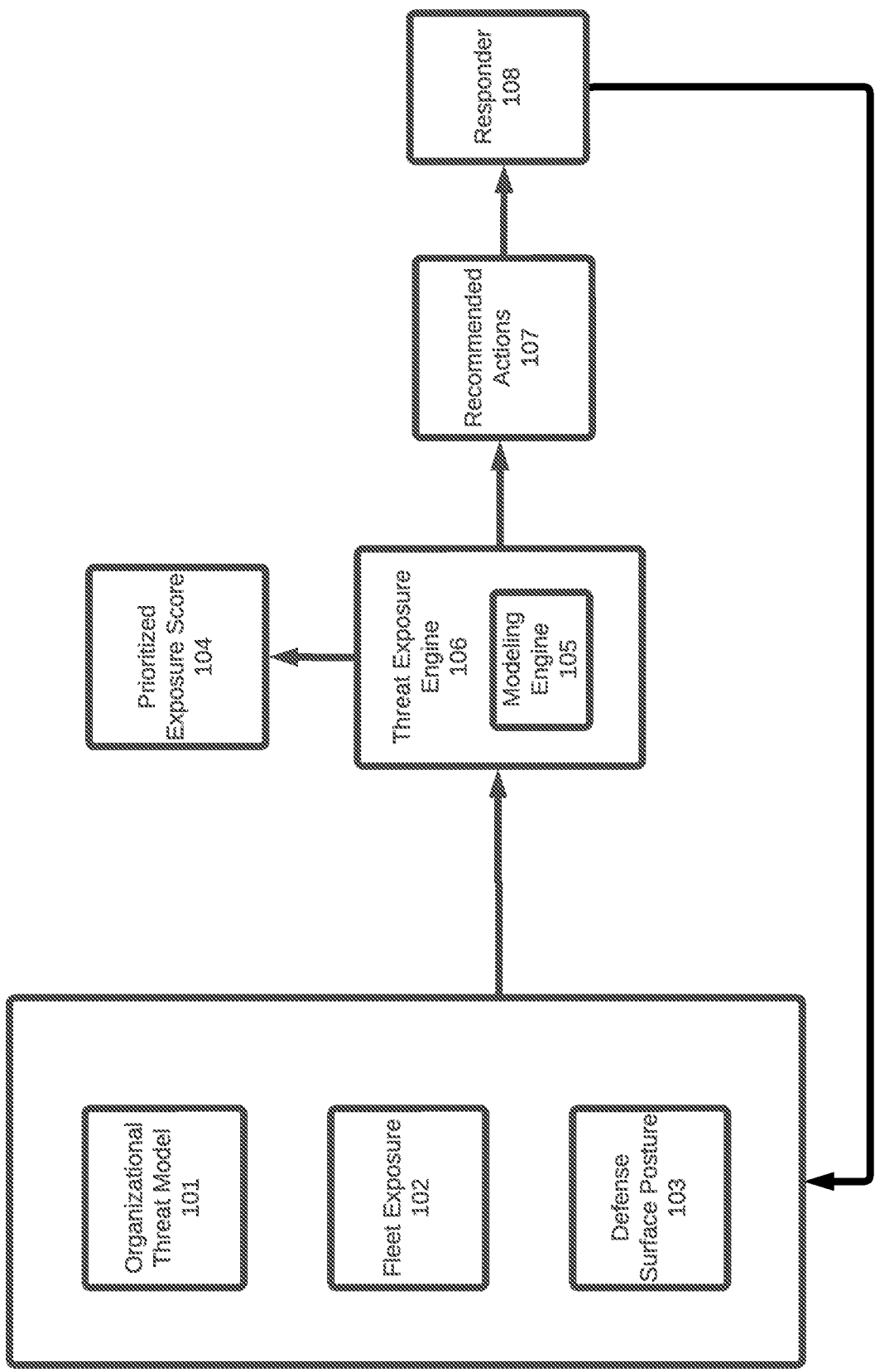
FIG. 1 illustrates an example overview of a method for prioritization of cyber threat information and responding to the prioritized information.

With reference to FIG. 1, based on a set of inputs, the threat exposure engine 106 generates a prioritized exposure score 104. The exposure engine 106 can further include a modeling engine 105, which can be configured to operate as described herein. Inputs to the threat exposure engine 106 can include organizational threat model information 101, fleet exposure information 102, and defense surface posture information 103. As non-limiting examples, defense surface posture information can include configuration, raw logs, detection logic, security control and policies. Based on these inputs, the exposure engine 106 can be configured to generate one or more of the prioritized threat exposure score 104 and a ranked, or prioritized, list of recommended actions and mitigations 107. As used herein, ranking, sorting, and prioritization are considered interchangeably. The ranked list of actions and mitigations 107 can also be provided to a responder 108, which can issue commands to a target organization defense surface, as explained herein. As changes to the target organization defense surface are caused by the commands, these are reflected in the organizational threat model information 101, fleet exposure information 102, and defense surface posture information 103.

Updated organizational threat model information 101, fleet exposure information 102, and defense surface posture information 103, or other parameters and information influenced by the commands are then provided to the threat exposure engine 106, which can be configured to create a further updated prioritized exposure score for any threat. Thus, a continuous, or substantially or effectively, continuous loop of prioritization and mitigation is created for the organization.

Threat Information Content Processing for Prioritization

Figure 2:
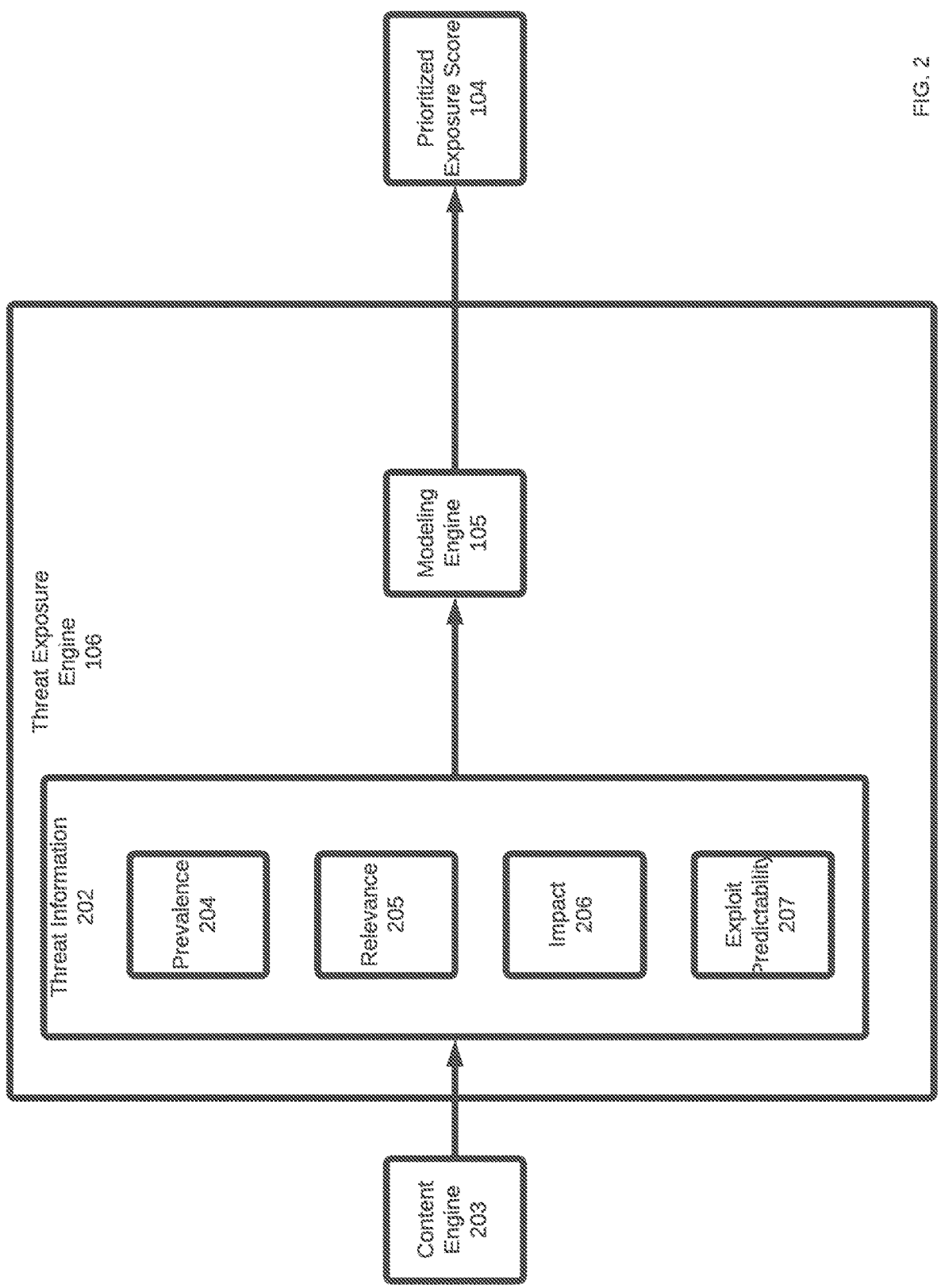
FIG. 2 illustrates processing with an example threat exposure engine.

Threat information content is also processed within the modeling engine. With reference to FIG. 2, output from the threat information content engine 203 is parsed and processed to generate threat information per indicator 202. The threat information per indicator can include prevalence 204, relevance 205, impact 206, and exploit predictability 207, among other parameters. The processed threat information 202 is input to modeling engine 105. The threat exposure engine 106 then produces a prioritized exposure score 104 for a specific threat indicator, as described in more detail herein.

An impact score indicating impact can be generated based on at least one characteristic, the prioritized set of adversarial groups, the prioritized set of adversarial software, the prioritized set of adversarial techniques, or a relationship associated with the mitigation and the adversarial technique.

While, in some embodiments, the methods and apparatus are described herein based on the MITRE ATT&CK® Framework, various other adversarial technique frameworks have been created to document the tactics, techniques, and procedures used by cyber adversaries to compromise their target's information technology (IT) infrastructure. Some examples of the adversarial technique frameworks are the National Security Agency/Central Security Service Technical Cyber Threat Framework (NTCTF), the MITRE ATT&CK® framework, Lockheed Martin Cyber Kill Chain, and/or the like.

Threat Exposure Engine

Figure 3:
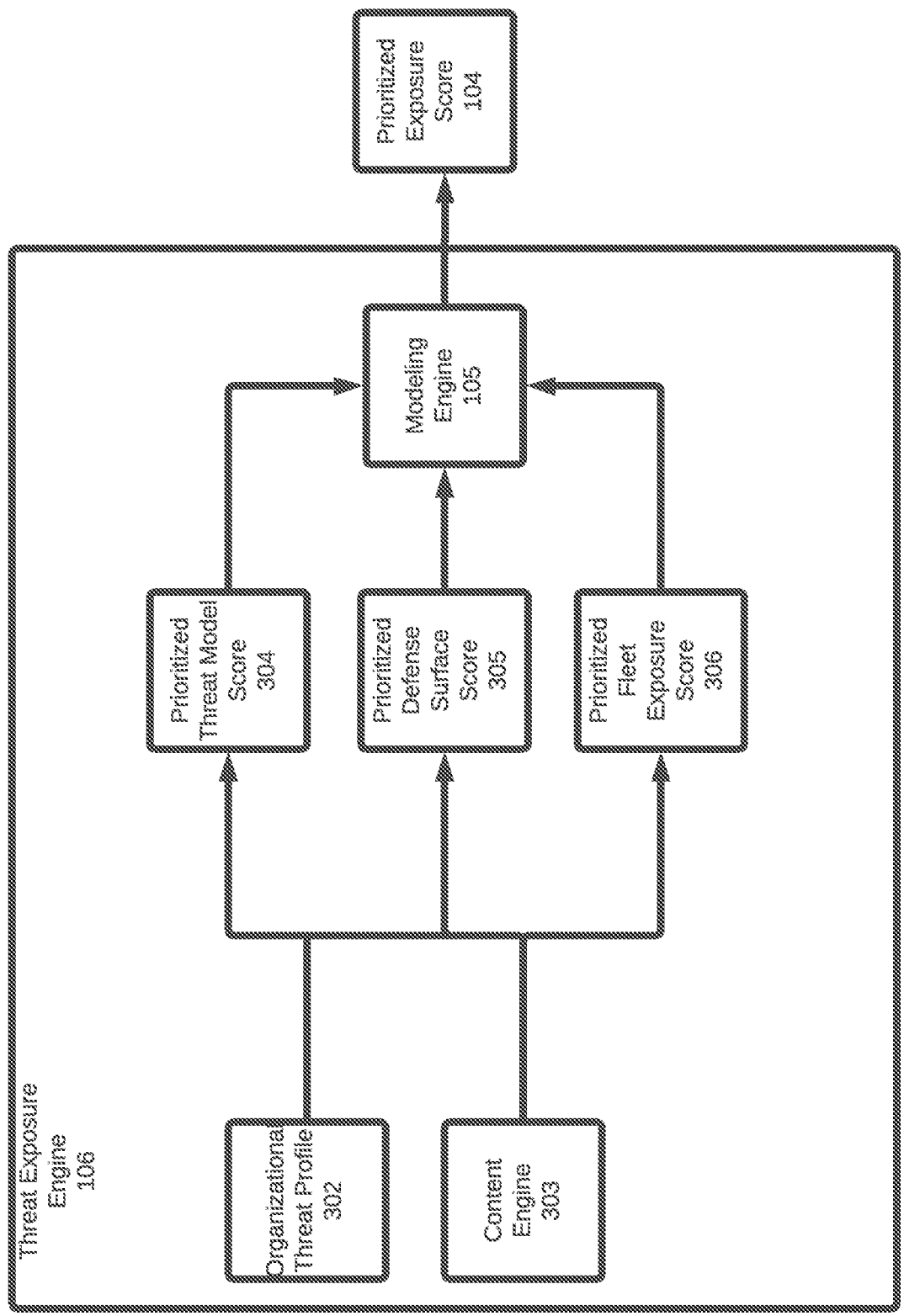
FIG. 3 illustrates processing in an example threat exposure engine.

With reference to FIG. 3, based on the organizational threat profile information 302 and content engine information 303, the threat exposure engine 106 can generate a prioritized threat model score 304, prioritized defense surface score 305, and a prioritized fleet exposure score 306. These are input to a modeling engine 105, which in turn generates a prioritized threat exposure score 104.

In some embodiments, technique prioritization in the modeling engine 105 can be driven using data composed of real-world adversarial campaigns or actions. Techniques do not occur in a vacuum, so some technique prioritization data can be derived from the targeting or motivations of the adversary executing them. For example, the customer threat profile can be based in part on questions asked of organizations or are derived from campaign victimology data.

As discussed in more detail herein, technique prioritization can be composed of baseline prioritization, which can apply to all customers equally, and customer or organizational threat profile, which can include details of the customer's business and environment.

Modeling Engine

Figure 4:
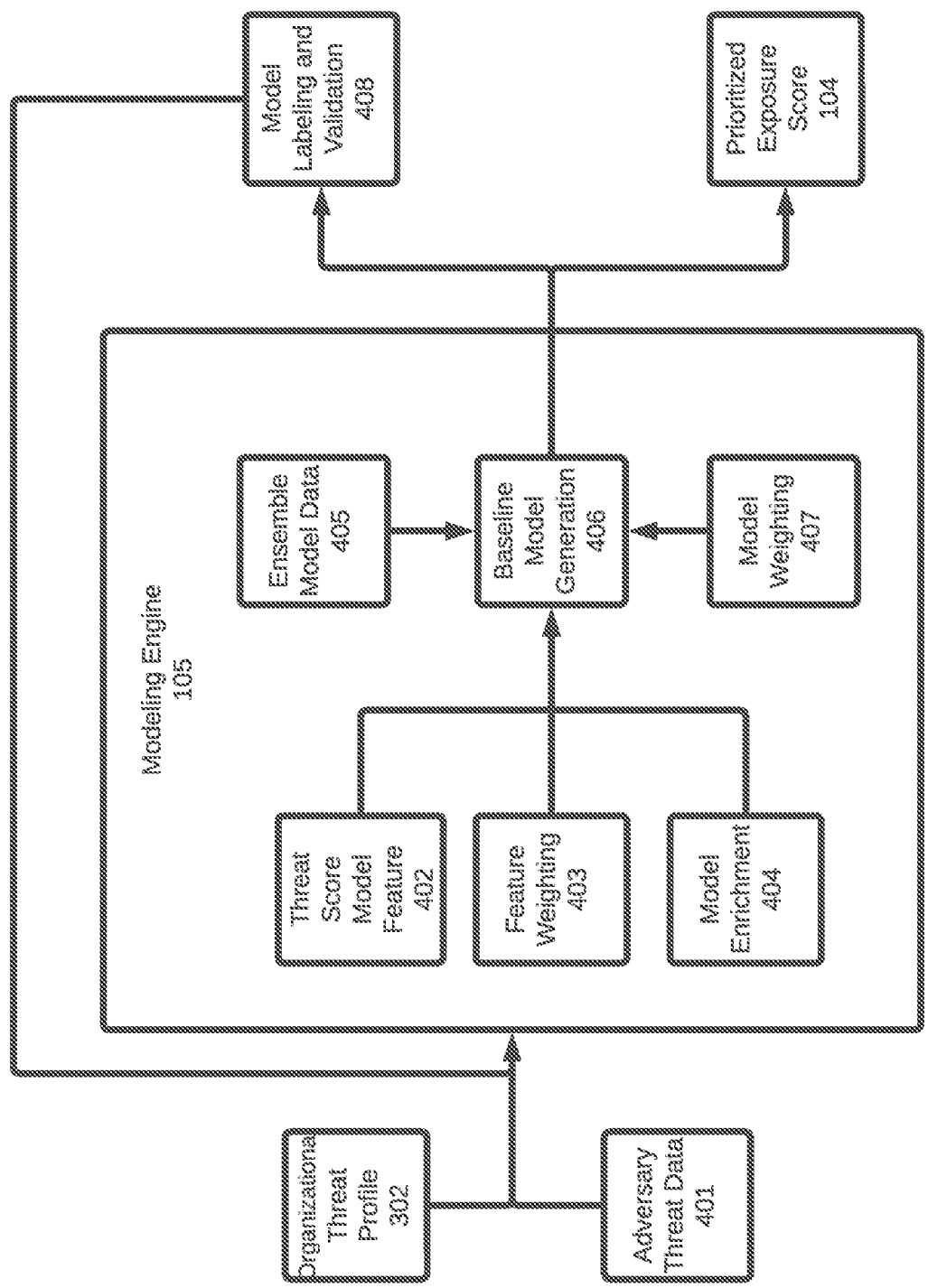
FIG. 4 illustrates processing by an example modeling engine to produce a prioritized threat exposure score.

With reference to FIG. 4, the threat exposure engine 106 includes modeling engine 105 which can be configured to process a multitude of different information types to generate the prioritized exposure score 104. Threat exposure information input can include some or all of the information defined above as threat exposure information.

As used herein, a model can be any structure that organizes data elements and standardizes how the data elements relate to one another. The models generated can be conceptual representations of the data described herein that describes the structure, relationships, constraints, and semantics of the data, and/or a set of rules that define how data is organized, stored, and manipulated within the system.

The data models described herein can be of any type, including conceptual describing the high-level concepts and relationships between them, logical specifying the details of the data elements and their relationships, and physical models, describing how the data is stored and accessed in a specific database management system.

Modeling engine 105 can be configured to generate prioritizations for one or more different types of cybersecurity information and different types or forms of threats entities that are made available to it. As non-limiting examples, the modeling engine 105 can generate prioritized scores for different types of threat entities, including but not limited to: technique information, group and software or malware, vulnerabilities, and/or assets. As used herein, including with respect to the figures, any of the foregoing are considered to be "threat" information, and the methods and systems operating on "threat" information are considered to be operating any of these classes or combinations thereof.

The modeling engine 105 can be configured to generate the prioritization for each of these different entities by based on inputs including organizational threat profile 302 and adversary threat data 401. Based on at least these inputs, the modeling engine 105 further generates a threat score model feature 402, feature weighting 403, and model enrichment 404. This information, combined with ensemble model data 405 and model weighting 407 is used by the baseline model generation 406 to generate a prioritized exposure score 104 for a specific threat. The baseline model generation 406 can also produce model labeling and validation information 408, which can be subsequently provided as an input back to modeling engine 105.

1. Technique Threat Entities

1A. Baseline Prioritization. Baseline prioritization at the baseline model generation 406 can be generated based on one or more of a number of parameters. As non-limiting examples, these parameters can include:

Prevalence: The frequency of which an attacker uses a technique.

Impact: The percentage of time it is used to achieve a defined impact.

Usability: The ease of use or the difficulty (adversary sophistication) required to execute a technique.

Actionability: The ability to detect or mitigate a technique. Some techniques are easily detected or mitigated, while others are not or require a very sophisticated and mature organization.

Co-Occurrence: The number of times technique A co-occurs with high-priority technique B.

Minimum Hitting Set: The smallest possible list made up of techniques that encompasses at least one technique out of every observed adversarial campaign.

Page Rank: Measure of importance of a technique in a graph (e.g., the ability to succeed depends on usage of Technique A)

1B. Organizational Threat Profile. As a non-limiting example, the organizational threat profile 302 can be based on a local context, and can embody the ability for the technique to be used within the customer environment. Some techniques only apply to certain platforms (e.g., operating systems, cloud providers). Since not all customers have all platforms, the system can use details of what exists within the environment in order to modify prioritization. As non-limiting examples, these parameters can include:

Country: The countries in which the customer operates.

Industry: The area in which the customer business operates.

Size: The number of employees.

Data: The types of data the customer manages, e.g., PII, PHI, and PCI.

2. Group and Software/Malware Entities

Group and software/malware prioritization can be derived in whole or in part from prevalence information. The system can be configured to use the priority of techniques commonly executed by groups and software/malware to flow up to group and software/malware prioritization.

3. Vulnerability Entities

Vulnerability prioritization can be composed of a number of factors that are shared across multiple, or even all, customers along with other customer specific data. Vulnerability prioritization can be based at least in part on one or more of baseline prioritization which applies to all customers equally, and customer specific covering vulnerabilities that exist within the customer environment.

3A. Baseline Prioritization.

Prevalence: The frequency of which an attacker uses a vulnerability.

Impact: Confidentiality, integrity, availability (CIA) impact (e.g. CVSS v3 Impact Metrics).

Exploitability: The ease of exploitability (e.g. CVSSv3 Exploitability metrics), use in the wild, or FIRST Exploit Prediction Scoring System (EPSS)

3B. Customer Specific.

Relevance (Local Context): The ability for the vulnerability to be used within the customer environment.

4. Asset Prioritization. Asset prioritization can be driven by customer specific information.

4A. Customer Specific.

Criticality: The importance of some asset (e.g. Fileserver with PII, git server, etc)

Exposure: The exposure of said asset (e.g. internet facing)

Security Product Coverage: Whether security products are either installed on the asset or cover (apply to) the asset in a different manner.

Figure 5:
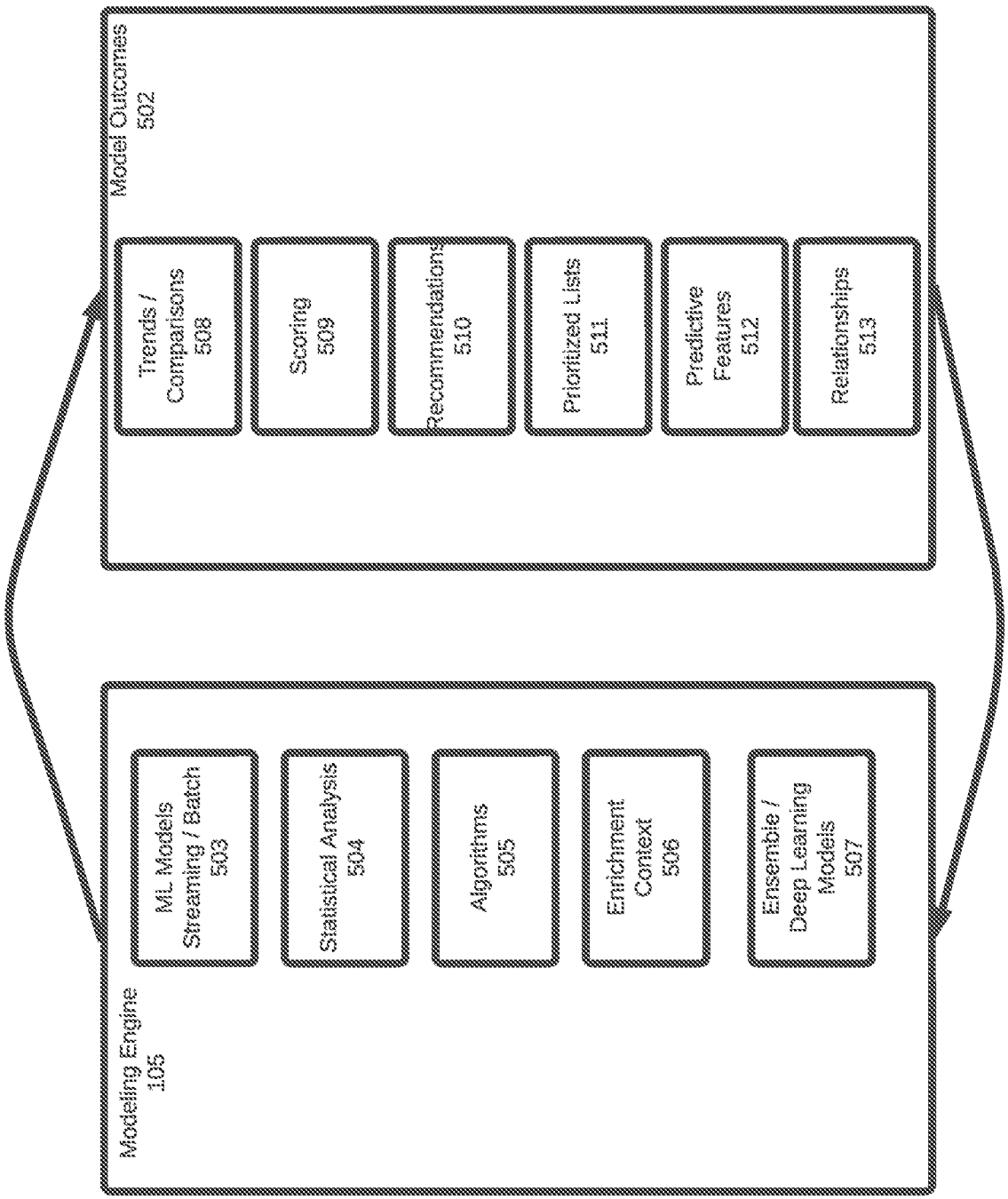
FIG. 5 illustrates processing by an example modeling engine to generate model outcomes.

Visibility/Detection/Control Coverage: Using the security product coverage, derive what visibility/detection/control coverage that product provides and apply it to the asset Model Outcomes Example features of the modeling engine are illustrated in FIG. 5. Modeling engine 105 can be configured to consume, as non-limiting examples, machine learning models 503, statistical analysis 504, algorithms 505, enrichment context 506, and/or ensemble or deep learning models 507. The model outcomes 502 can include trends or comparisons 508, scoring 509, recommendations 510, prioritized lists 511, predictive features 512, and relationships 513.

Organizational Threat Profiles

Figure 6:
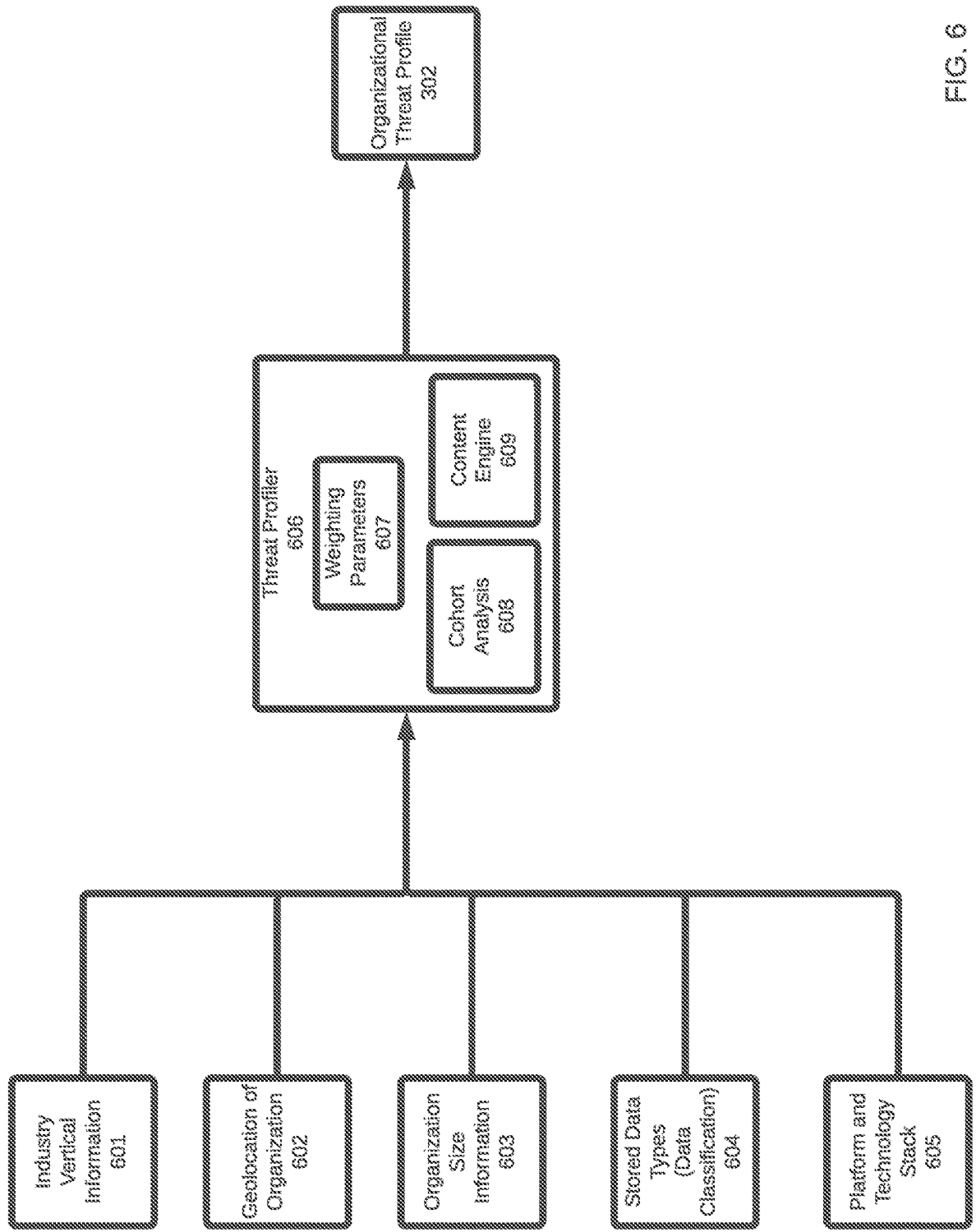
FIG. 6 illustrates an example method for generating an organizational threat profile.
Figure 7:
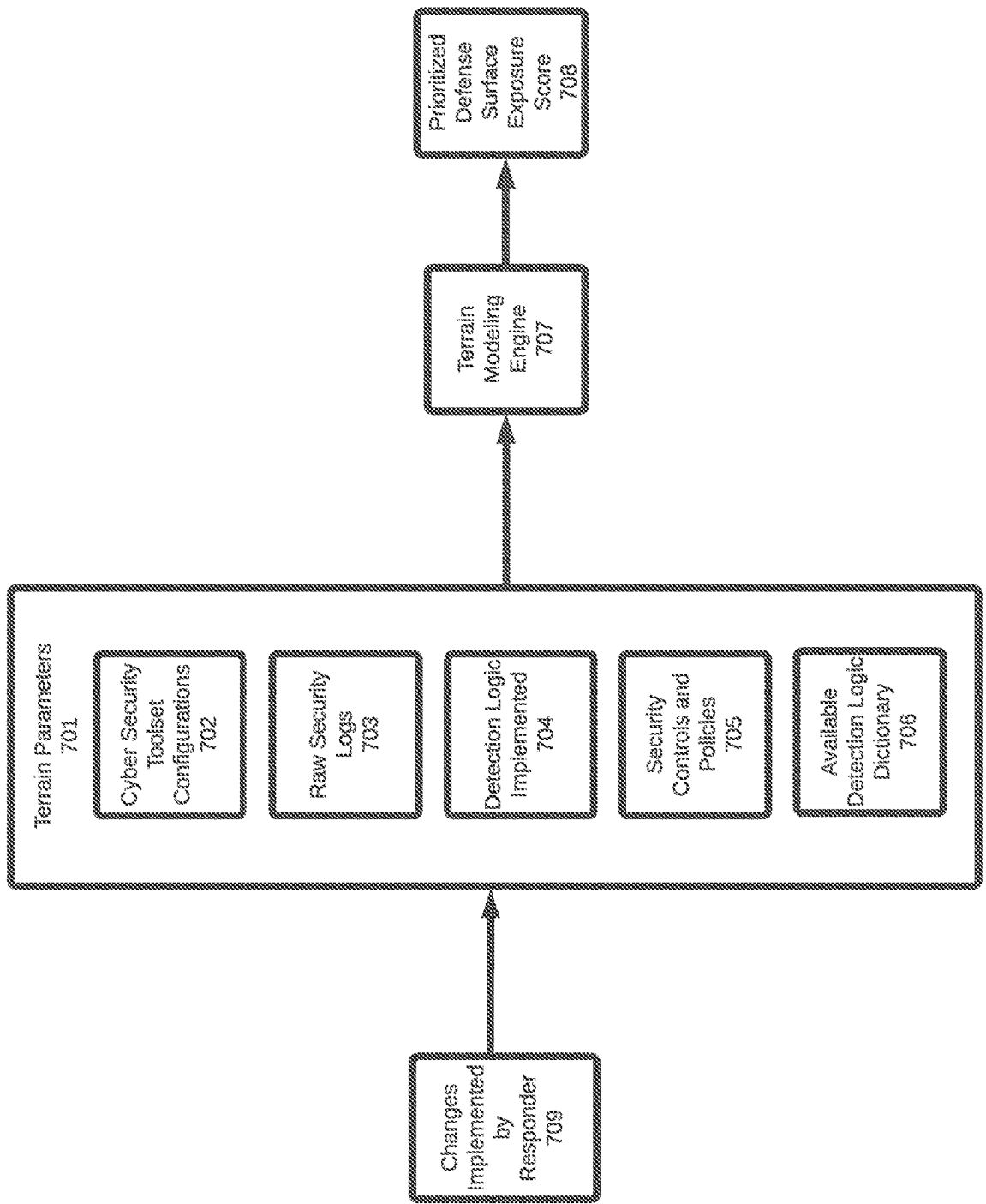
FIG. 7 illustrates an example method for generating a prioritized defense surface exposure score.

As disclosed above, an organizational threat profile or model is created. With reference to FIG. 6, organizational threat profiler 606 can receive as inputs industry vertical information 601, geolocation information 602, organization size information 603, stored data types 604, and/or platform and technology stack information 605. The threat profiler 606 can include weighting parameters 607, cohort analysis 608, and content engine 609. The output of the threat profiler can be an organizational threat model 302.

Figure 13:
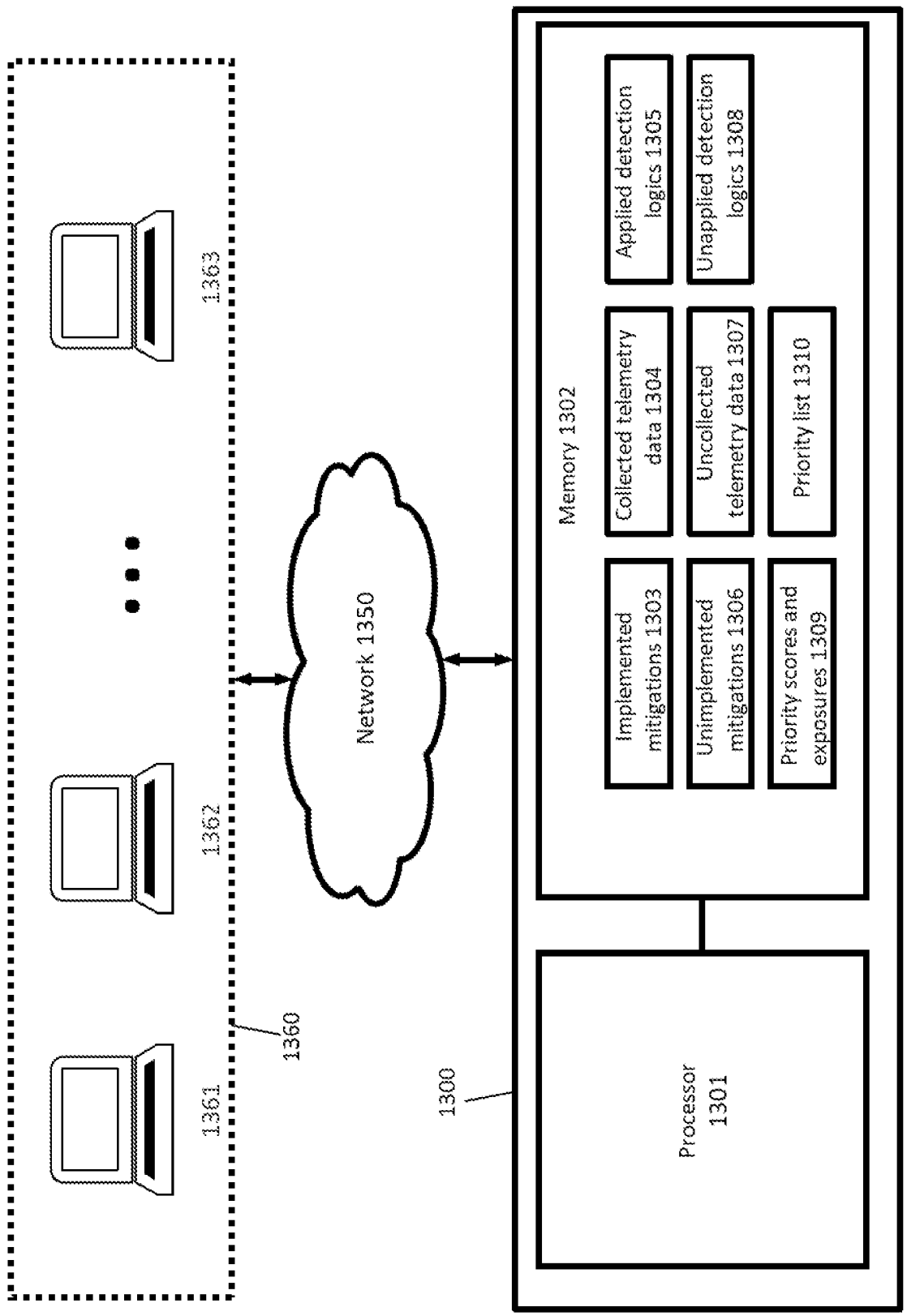
FIG. 13 is a schematic block diagram of an example computerized system for managing and storing threat priority scores and lists.

At least one characteristic associated with an organization (e.g., a type of data protected by the organization, a size of the organization, an industry sector of the organization, a geolocation of the organization, and/or the like) can be received (e.g., from compute devices 1361, 1362, and/or 1363, or a compute device not shown in FIG. 13, etc. Further characteristics of the organization can include, for example, at least a type of data (personally-identifying information (PII) data type, payment card industry (PCI) data type, protected health information (PHI) data type, etc.) protected by the organization, a size of the organization (number of employees, revenue, etc.), and/or an industry sector (health care, defense, semiconductor, information technology, etc.) of the organization.

Prioritized Defense Surface Exposure Score

A prioritized defense exposure score 708 can be generated. Terrain modeling engine 707 can be configured to receive terrain parameters 701. Terrain parameters 701 can include, as non-limiting examples, cybersecurity toolset configurations 702, raw security logs 703, detection logic implemented 704, security controls and policies 705, and/or available detection logic dictionary 706. Any or all of the terrain parameters 701 can be influenced or affected by changes having been made by responder 709.

The prioritized defense surface exposure score 708 can include, as non-limiting examples, and with reference to FIG. 13, a set of mitigations (e.g., implemented mitigations 1303) implemented at a computer environment (e.g., computer environment 1360) associated with the organization, a set of telemetry data (e.g., collected telemetry data 1304) collected at the computer environment associated with the organization, and a set of detection logics (e.g., applied detection logics 1305) applied at the computer environment associated with the organization are identified for the computer environment.

Fleet Exposure Engine

Figure 8:
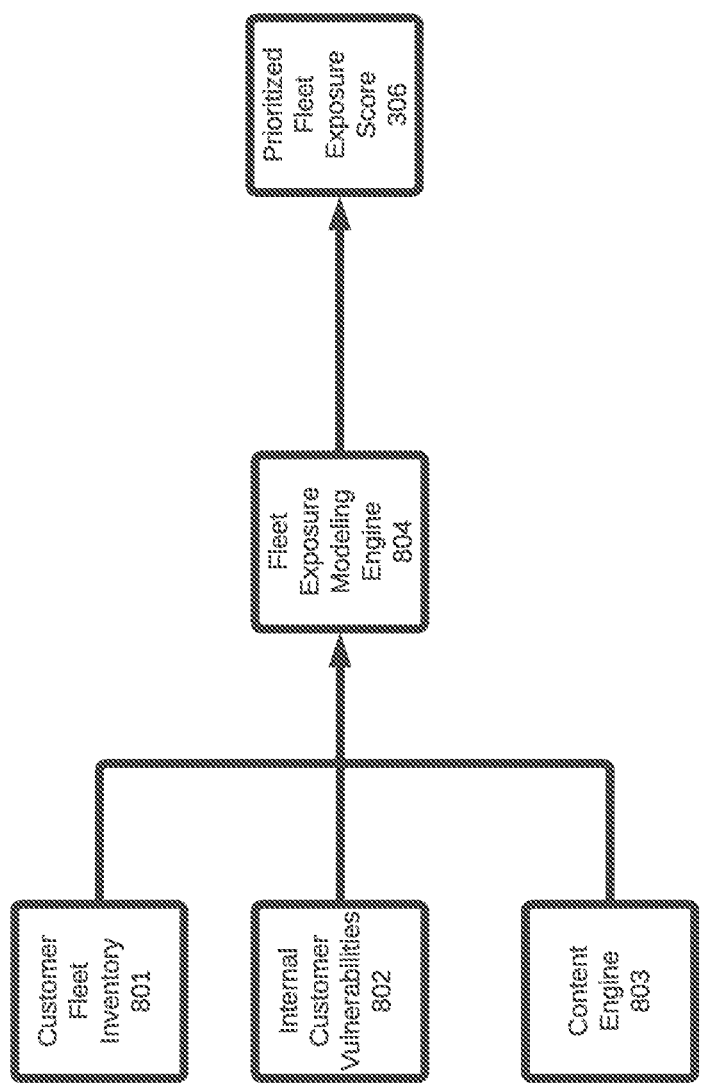
FIG. 8 illustrates an example method for generating a prioritized fleet exposure score.

As disclosed above, a prioritized fleet exposure score is generated. With reference to FIG. 8, prioritized fleet exposure score 306 is generated by fleet exposure modeling engine 804. Fleet exposure modeling engine 804 can receive as inputs, as non-limiting examples, information concerning customer fleet inventory 801, internal customer vulnerabilities 802, and content engine 803.

Creation of Priority Lists

Figure 9:
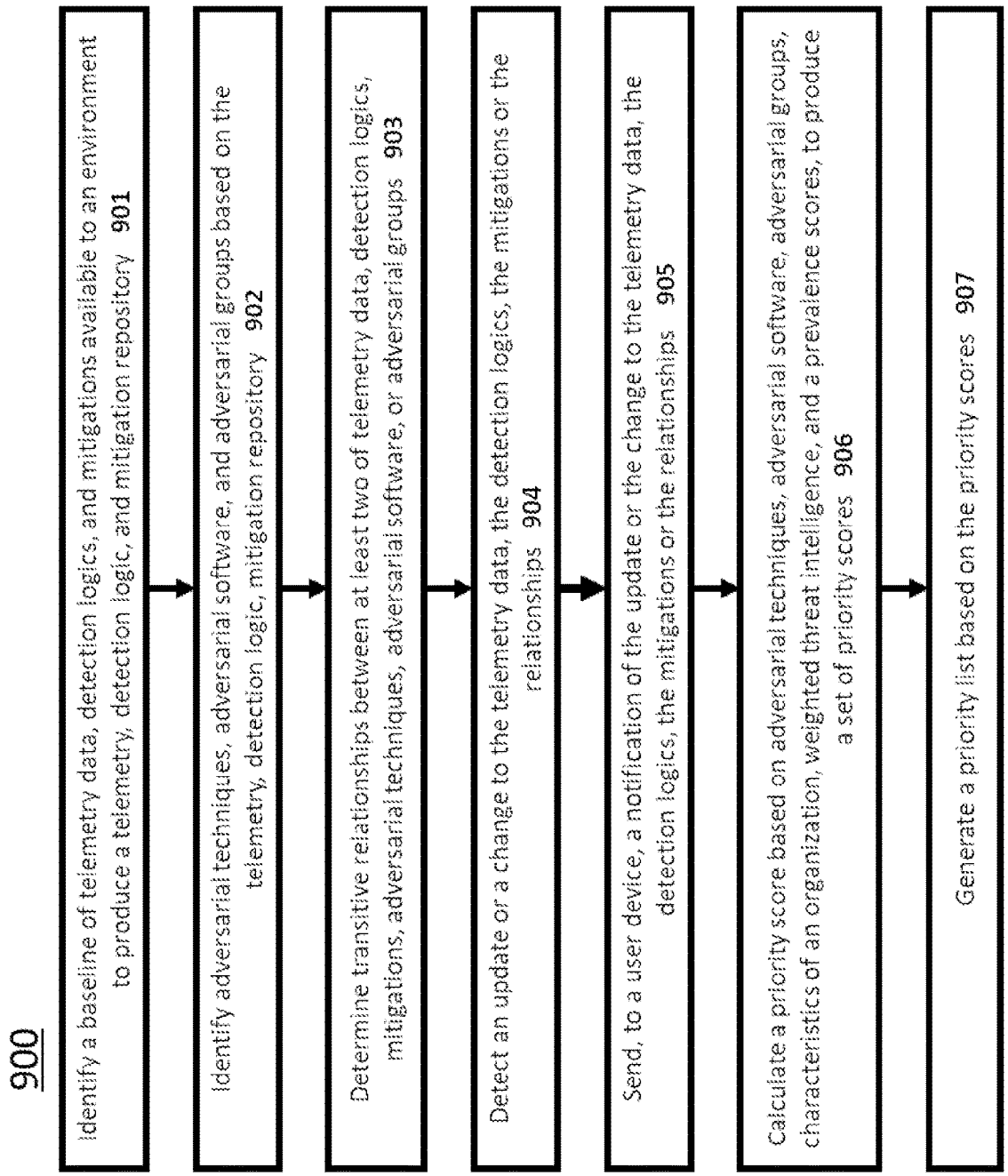
FIG. 9 illustrates an example method for generating a prioritized exposure score.

FIG. 9 illustrates a method 900 for generating a priority list based on multiple sets of priority scores, according to an embodiment. In some implementations, the method can be performed by a processor (e.g., processor 1301) of a compute device (e.g., prioritization system 1300). As shown in FIG. 9, the method can be performed, for example, by a defense awareness and prioritization device (such as the defense awareness and prioritization device 1210 as shown and described with respect to FIG. 12).

At 901, a baseline of telemetry data, detection logics, and mitigations (also referred to as the "telemetry, detection logic, and mitigation repository") available to an environment (e.g., a cyber defense environment of an organization) is identified. In other words, telemetry data and detection logics can be identified and collected from some or all available cyber defense tools (e.g., the telemetry device 1280, a firewall, an endpoint detection and response (EDR), a cloud telemetry, an anti-virus (AV) software a data lake, an intrusion detection system (IDS), an intrusion prevention system (IPS), a network appliance, an endpoint protection platform (EPP), and/or the like) and be used to produce the telemetry, detection logic, and mitigation repository. The telemetry, detection logic, and mitigation repository can be stored locally in the memory of the defense awareness and prioritization device. In some implementations, the defense awareness and prioritization device can detect telemetry overlap and/or detection logics in the telemetry, detection logic, and mitigation repository and make recommendations to remove redundant telemetry data and detection logic from the telemetry, detection logic, and mitigation repository. Detecting overall in telemetry data and/or detection logics and/or mitigations can be done similar to the apparatus and methods described in U.S. Pat. No. 11,252,188, filed on Mar. 10, 2021 and entitled "METHODS AND APPARATUS TO AUTOMATE CYBER DEFENSE DECISION PROCESS AND RESPONSE ACTIONS BY OPERATIONALIZING ADVERSARIAL TECHNIQUE FRAMEWORKS", which is incorporated herein in its entirety by this reference.

At 902, adversarial techniques, adversarial software, and adversarial groups are identified based on the telemetry, detection logic, and mitigation repository. For example, in some instances, the adversarial techniques, the adversarial software, and the adversarial groups are identified by mapping the telemetry data and the detection logics in the telemetry, detection logic, and mitigation repository to at least one adversarial technique framework (e.g., MITRE ATT&CK® framework).

At 903, transitive relationships between at least two of the telemetry data, the detection logics, the mitigations, the adversarial techniques, the adversarial software, or the adversarial groups are determined. The transitive relationships can be stored in a relationship repository. The relationship repository can be stored locally in the memory of the defense awareness and prioritization device.

At 904, an update and/or a change to the telemetry data, the detection logics, the mitigations, or the relationships is detected. In some instances, for example, user account activities (e.g., of employees of the organization) of the cyber defense environment can be continuously monitored to ensure the logs are present and available to users (e.g., defenders) ensuring detection logics will trigger alerts if suspicious activity occurs.

At 905, a user (e.g., a user of the defense environment and prioritization device 1210) is notified of the update or the change to the telemetry data, the detection logics, the mitigations, or the relationships. In some instances, the user can be notified via a text message, a pop-up window in a work laptop, an automated phone call, and/or the like.

At 906, a priority score is calculated for each adversarial technique from the adversarial techniques, adversarial software, adversarial group, based on one or more of the characteristics of an organization, weighted threat intelligence, and a prevalence score, to produce a set of priority scores.

At 907, a priority list including at least one of a subset of adversarial techniques from the adversarial techniques, a subset of adversarial software from the adversarial software, and a subset of adversarial groups from the adversarial groups, is generated based on the set of priority scores. For example, in some instances, the priority list can include top ten adversarial techniques from the adversarial techniques, top ten adversarial software from the adversarial software, and/or top ten adversarial groups from the adversarial groups. Therefore, the priority list includes entry that can be, for example, displayed on a monitor screen to the user of the defense awareness and prioritization device.

In some embodiments, the method 900 can optionally include generating historical telemetry data, historical adversarial techniques, and historical detection instances by storing the telemetry data, adversarial techniques relevant to those telemetry data, and detection instances during a time interval. The time interval can be determined case by case. In some instances, the time interval can be an hour, a day, a month, a year, and/or the like. A machine learning model (e.g., an artificial neural network) can be trained based on the historical telemetry data, the historical adversarial techniques, and/or the historical detection instances. The machine learning model can be trained, for example, using a gradient descent and by iteratively executing the machine learning model to optimize an output of an objective function. Once trained, the machine learning model can receive (1) telemetry data not included within the historical telemetry data and/or (2) at least one detection instance not included within the historical detection instances. The machine learning model can be executed to predict an occurrence of an adversarial technique and a confidence score for the occurrence of the adversarial technique, based on the telemetry data and the at least one detection instance.

In some instances, the machine learning model can be executed to predict an adversary attack chain that includes an occurrence of a first adversarial technique and a second adversarial technique subsequent to the first adversarial technique. The machine learning model can be executed to predict an attack chain response action(s) to prevent the second adversarial technique after the occurrence of the first adversarial technique and before an occurrence of the second adversarial technique. In some instances, the machine learning model can be a neural network that is configured to receive a first time series data and generate a second time series data based on the first time series data. For example, the neural network can be configured to receive an occurrence of a first set of timestamped adversarial techniques (e.g., detected by telemetry sensor(s)) and predict an occurrence of a second set of timestamped adversarial techniques based on the first set of timestamped adversarial techniques.

In some examples, the machine learning model for analyzing time series data can include, a multi-layer perceptron model, a Bayesian neural network model, a radial basis function model, a generalized regression neural network model, a K-nearest neighbor regression model, a classification and regression trees (CART) model, a support vector regression model, a Gaussian processes model, a recurrent neural network model, and/or the like.

Surface Change Control for Mitigations

Figure 10:
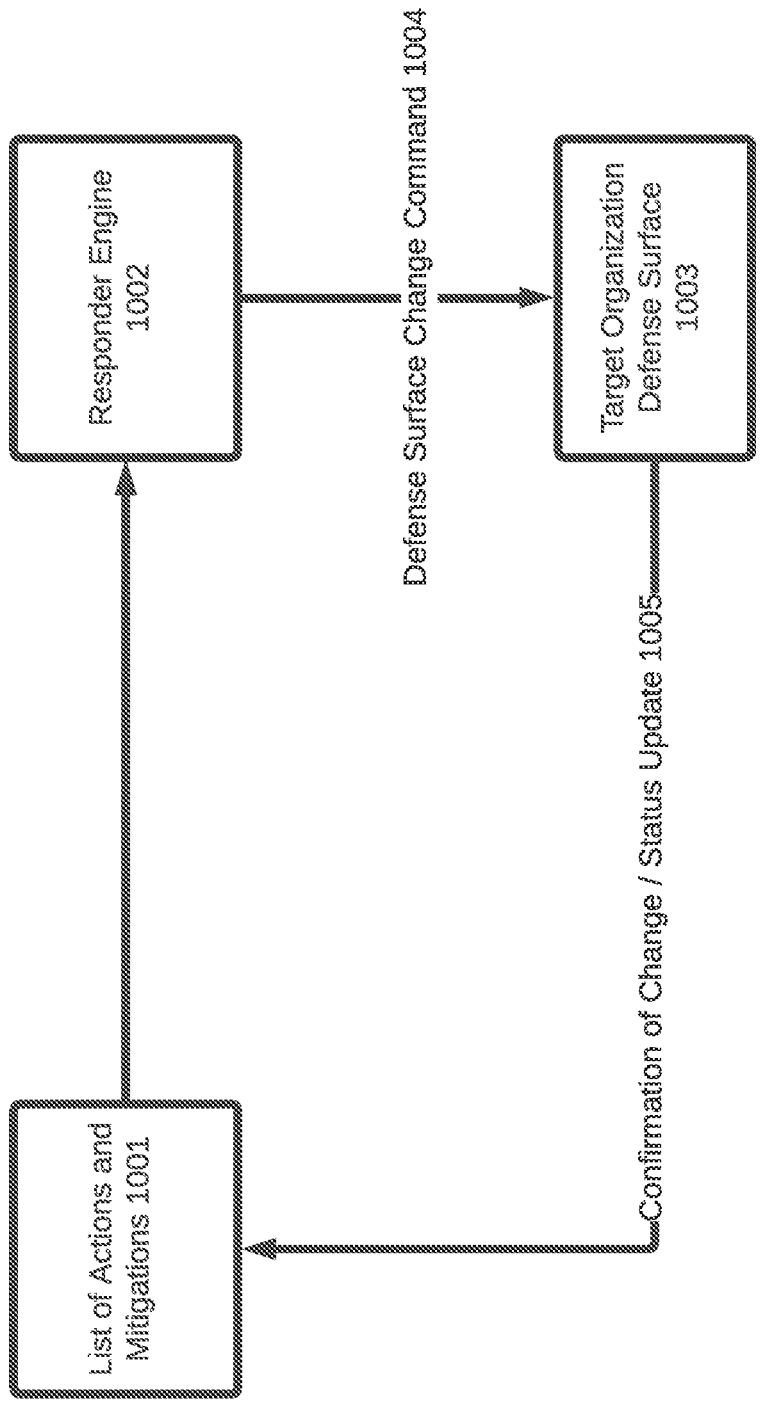
FIG. 10 illustrates an example method for changing a defense surface configuration in response to a prioritized exposure score.

With reference to FIG. 10, responder engine 1002 receives a ranked or unranked list 1001 of actions and mitigations derived from modeling engine 105. The responder engine 1002 can generate a defense surface change command 1004 to the target organization defense surface 1003. After the target organization has implemented or otherwise effected the change, confirmation of this change can be sent as a status update 1005 to the modeling engine 105, at which point it can generate an updated ranked list 1001. The updated ranked list 1001 may, or may not, trigger responder 1002 to issue further change commands to the target organization 1003.

As described herein, a priority list including a set of prioritized exposure scores, and further including the mitigation, the telemetry data, and the detection logic can be generated. In some implementations, the priority list is further generated based on one or more characteristics of an organization 1003 associated with the computer environment, such as a type of data associated with (e.g., protected by) the organization, a size of the organization, an industry sector of the organization, a geolocation of the organization, and/or the like.

In some implementations, the defense awareness and prioritization device can take remedial action according to the priority score and/or the priority list. In some instances, for example, the defense awareness and prioritization device can automatically determine and change a characteristic of a network (e.g., activating a virtual private network (VPN)) based on an adversarial technique having a priority score above a predetermined threshold (e.g., a score above 90%). In some instances, for example, the defense awareness and prioritization device can automatically change a characteristic of a telemetry sensor (e.g., activating a specific detector of the telemetry sensor) based on a priority score of a priority technique and a priority score of an adversarial software. In some instances, for example, the defense awareness and prioritization device can automatically execute a set of automated mitigations from highest priority score to lowest priority score. In some instances, for example, based on a priority score meeting a predetermined threshold, the defense awareness and prioritization device can isolate itself from all or some network connections (e.g., isolate only from external connections and compute devices that are exposed to external connections) and the user of the defense awareness and prioritization device can be notified to confirm isolation of the defense awareness and prioritization device.

With reference to FIG. 13, the implemented mitigations 1303 can include representations of mitigation techniques that are being applied at the computer environment 1360. The collected telemetry data 1304 can include representations of telemetry data that is being collected at the computer environment 1360. The applied detection logic 1305 can include representations of detection logics that are being applied at the computer environment 1360. In some implementations, the prioritization system 1300 can scan the cyber defense tools used at the computer environment 1360 to identify the implemented mitigations 1303, collected telemetry data 1304, and/or applied detection logics 1305. For example, the prioritization system 1300 can send a signal(s) to compute devices 1361, 1362, 1363 requesting the local operating systems of compute devices 1361, 1362, 1363 respond with indications of implemented mitigations, collected telemetry data, and/or applied detection logics (e.g., via an API(s)). In some implementations, each local operating software of compute devices 1361, 1362, 1363 can be configured to interrogate local software (e.g., local cyber software) and/or use an agent to identify and/or send indications of the implemented mitigations, collected telemetry data, and/or applied detection logics. In some implementations, prioritization system 1300 can connect to cyber security tools, data lakes, active directory, etc. at compute environment 1360 (e.g., via an API(s)), and determine the mitigations, telemetry data, and detection logics that are presented.

Some implementations further include connecting to a compute device (e.g., compute deice 1361, 1362, and/or 1363 of FIG. 13) storing a set of cyber defense tools associated with the computer environment using for example an application programming interface (API). The set of cyber defense tools can be scanned to identify the set of implemented mitigations, the set of collected telemetry data, and the set of applied detection logics. In some implementations, the set of cyber defense tools includes an endpoint detection and response (EDR), an intrusion detection system (IDS), an intrusion prevention system (IPS), a network appliance, a data lake, a security information and event management (SIEM) system, and/or a cloud telemetry.

Some implementations of method further include connecting, using an application programming interface (API), to a compute device (e.g., compute device 1361, 1362, and/or 1363, a compute device not shown in FIG. 13, etc.) storing a set of cyber defense tools associated with the computer environment. The set of cyber defense tools can be scanned to identify the set of mitigations, the set of telemetry data, the set of detection logics, and an indication quantifying alerts provided in the computer environment for each detection logic from the set of detection logics.

Some implementations further include repeatedly monitoring the set of implementation mitigations, the set of collected telemetry data, and/or the set of applied detection logics for a change, detecting the change, and causing a representation of the change to be displayed (e.g., at prioritization system 1300, at compute device 1361, 1362, and/or 1363, a compute device not shown in FIG. 13, etc.).

Some implementations further include sending a signal to cause an unimplemented mitigation from the subset of unimplemented mitigations to be implemented, an uncollected telemetry data from the subset of uncollected telemetry data to be collected, and/or an unapplied detection logic from the subset of unapplied detection logics to be applied (e.g., at compute device 1361, 1362, and/or 1363 of FIG. 13). Some implementations of method 900 further include causing, based on the set of impact information, the mitigation to be implemented in the computer environment, the telemetry data to be collected in the computer environment, and/or the detection logic to be applied in the computer environment.

Some implementations of method further include sending a first signal to cause the mitigation to be implemented to mitigate the adversarial technique. A second signal can be sent to cause the telemetry data to be collected to monitor the adversarial technique. A third signal can be sent to cause the detection logic to be applied to detected the adversarial technique. The first signal, the second signal, third signal or any combination thereof can be for example combined into a single signal.

In some implementations, the prioritization device 1300 can use the priority list 1310 to cause one or more unimplemented mitigations from the unimplemented mitigations 1306 to be implemented, one or more uncollected telemetry data from the uncollected telemetry data 1307 to be collected, and/or one or more unapplied detection logic from unapplied detection logics 1308 to be applied, such as causing all mitigations, telemetry data, and/or detection logics included in the priority list 1310 to be implemented at the computer environment 1360, causing those mitigations, telemetry data, and/or detection logics with the top X impact scores in the priority list 1310 to be implemented at the computer environment 1360 (where X can be any integer).

In some implementations, the prioritization device 1300 can collect alerts that have been triggered at the computer environment 1360 to analyze the efficacy of the applied detection logics 1305. In some implementations, the prioritization device 1300 can display (and/or cause display at another device) screens.

A potential advantage provided by this method is that security of a compute device (e.g., prioritization system 1300, compute device 1361, 1362, and/or 1363, a compute device not shown in FIG. 13, etc.) can be increased and/or improved. For example, a mitigation that more effectively mitigates a risk can be implemented that may not otherwise have been implemented, telemetry data that more effectively mitigates a risk can be collected that may not otherwise have been collected, detection logic that more effectively mitigate a risk can be applied that may not otherwise have been applied, and/or the like. Moreover, another potential advantage provided by the method is that an efficiency of a compute device (e.g., prioritization system 1300, compute device 1361, 1362, and/or 1363, a compute device not shown in FIG. 13, etc.) can be increased and/or improved. For example, those mitigations, telemetry data, and/or detection logics that are most effective at mitigating a risk can be implemented, collected, and/or applied, while those mitigations, telemetry data, and/or detection logics that are less effective at mitigating a risk are not implemented, collected, and/or applied.

Although mitigations are discussed above in the context of a mitigation preventing an adversarial technique, it should be understood that such a mitigation need not be limited to just preventing a single adversarial technique. Rather, a mitigation or set of coordinated mitigations can be selected (or predefined, or selected, or configured) to prevent not only an initial adversarial technique but also possible subsequent adversarial techniques. Any given adversarial technique cannot move (or be followed by) any other adversarial technique, but instead can only move (or be followed by) a subset of possible adversarial techniques. In other words, a given adversarial technique only has a subset of possible subsequent adversarial techniques. Thus, for a given adversarial technique, an attack chain (e.g., an ordered list of possible adversarial techniques that can follow a given adversarial technique) can be identified (or predicted), for example, by machine learning models/techniques. This allows a system (e.g., defense awareness and prioritization device 1210 of FIG. 12), at machine speed, to predict a future adversarial technique(s) that follow a given adversarial technique and select/take mitigations prior to an adversary moving to that future adversarial technique(s).

Data Relationship Map and Threat Data Model

Figure 11:
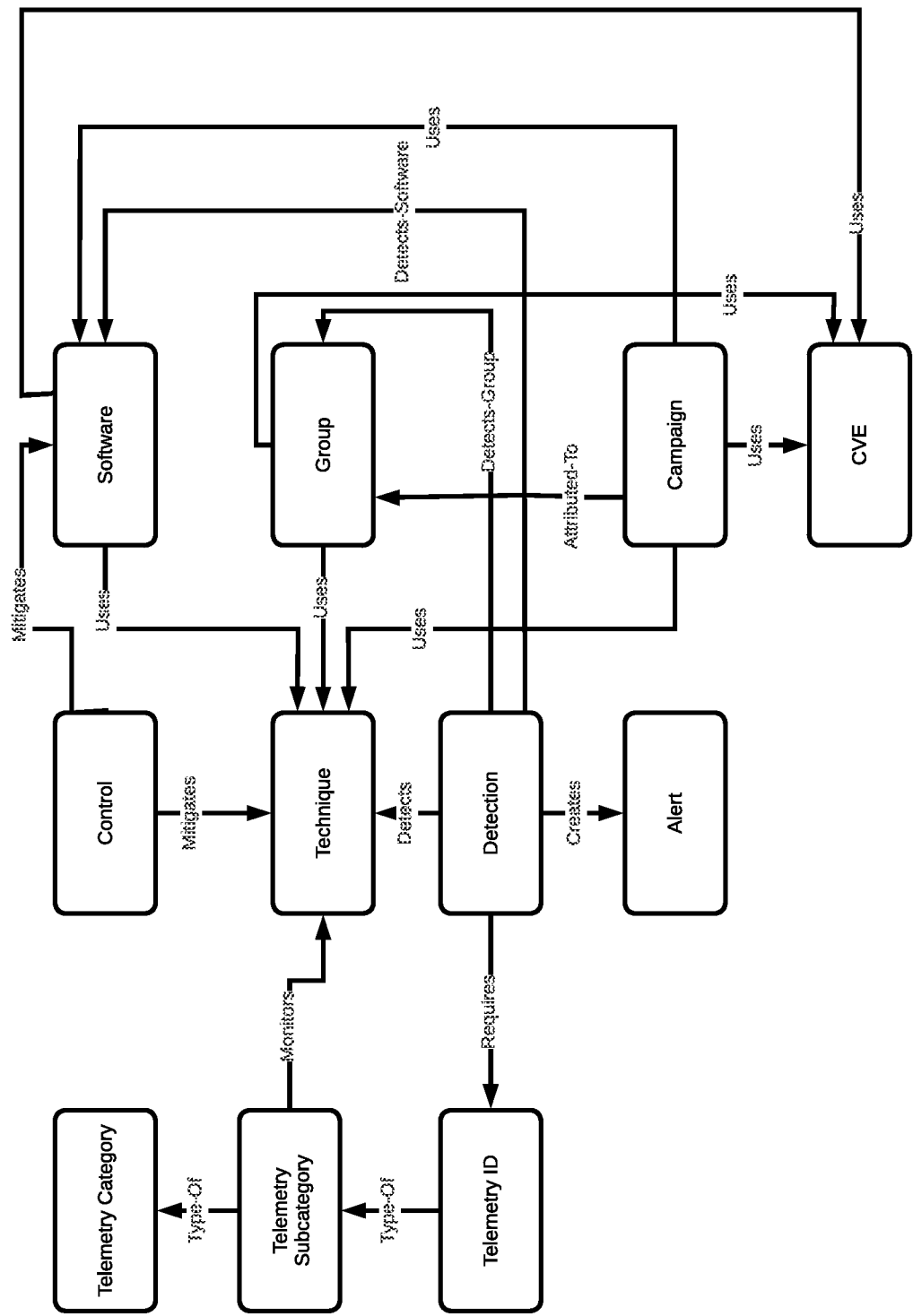
FIG. 11 is a data model diagram showing example relationships between various categories of data referenced by the systems and methods.

An example of relationships for the threat data model is shown in FIG. 11, according to an embodiment. Telemetry (i.e., telemetry data) can be associated with an identifier (e.g., Sysmon/Up Code), a primitive (e.g., Process Created File), a subcategory (e.g., File Creation), and a category (e.g., file), where the identifier can identify the primitive, the primitive can be a type of subcategory, and the subcategory can be a type of category. The telemetry category can be used to monitor techniques, while detection (i.e., detection logic) can (a) use (e.g., require) the telemetry primitive, and (b) detect techniques. Techniques can refer to an adversarial technique used by group (i.e., an adversarial group). The group can use software (i.e., adversarial software) to perform the techniques. Mitigation can mitigate the techniques. Assessment can (a) emulate the group, and (b) validate the detection. In some implementations, the telemetry category, technique and detection have a transitive relationship, so mapping a detection to a technique can update the telemetry category(ies) monitor the technique.

Example Defense Environment and Prioritization Calculation Methods

Figure 12:
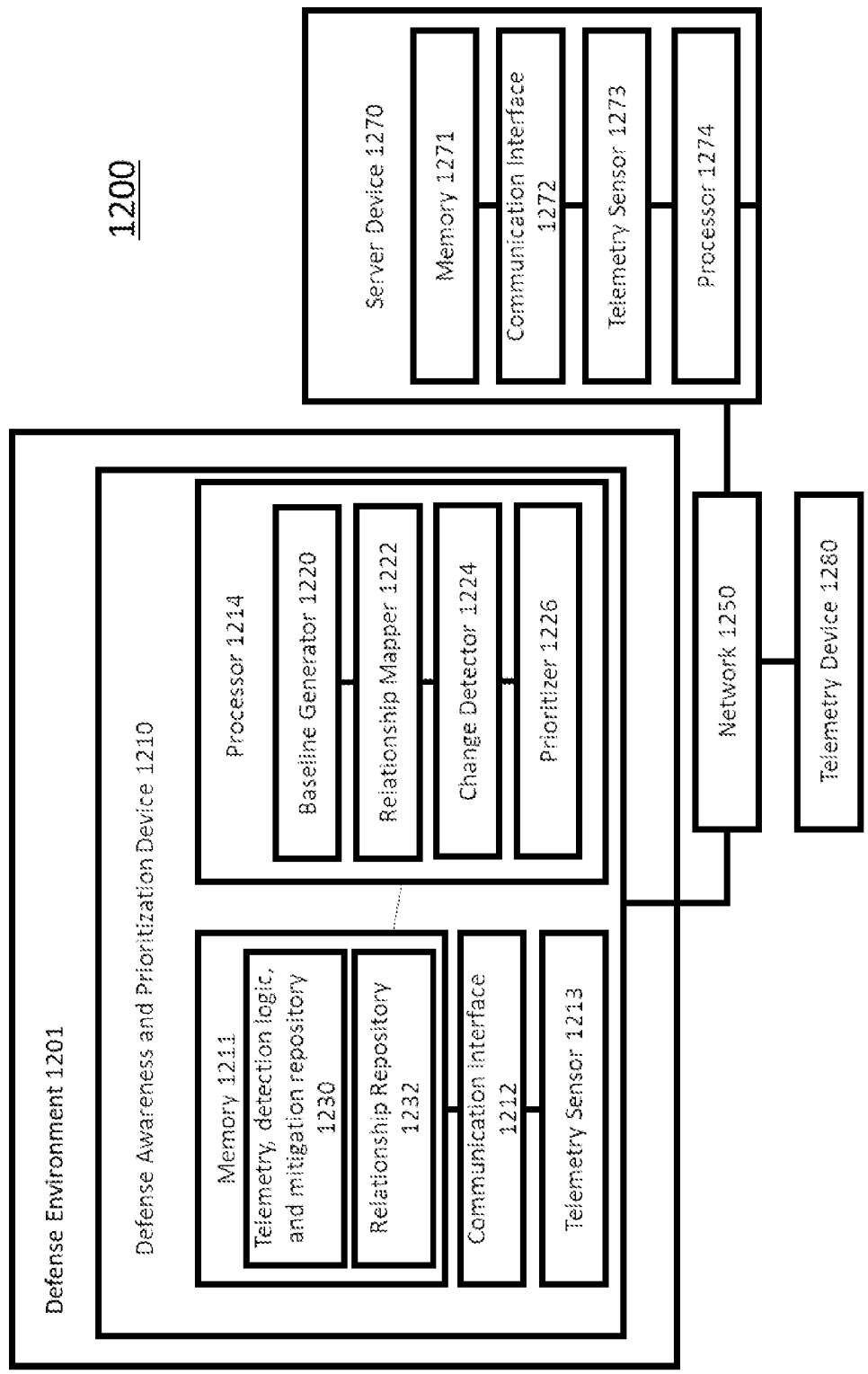
FIG. 12 is a schematic block diagram of an example prioritization system and computer environment.

With reference to FIG. 12, the threat intelligence can be received (e.g., from the server device 1270 and via the network 1250) from threat intelligence sources (e.g., FireEye™, Cybersecurity & Infrastructure Security Agency (CISA), MITRE CTI™, and/or the like) to derive metrics from retrospective cyber incidents (e.g., number of techniques in a cyber incident(s), software used in the cyber incident(s), industry sectors targeted in the cyber incident(s), type of data compromised by specific adversarial group(s) in the cyber incident(s)). The weights of the threat intelligence can include a set of weights associated with each threat intelligence source. The set of weights can be user defined numbers (e.g., integers between 1-10) that can be used as factors to determine how priority scores should be affected by input from the threat intelligence sources.

For example, the prevalence score $S_{pr}$ can be calculated using:

$$S_{pr} = \sum_i^n S_n W_n$$

where $S_n$ represents a prevalence score from a threat intelligence source (e.g., FireEye™, Cybersecurity & Infrastructure Security Agency (CISA), MITRE CTI™, and/or the like) and $W_n$ represents the weight associated to the threat intelligence source.

Once priority scores are calculated (e.g., for adversarial technique, adversarial software, adversarial group, mitigation, telemetry collection, detection logics creation, and/or the like), the prioritizer 1226 can be configured to automatically and substantially at machine speed prioritize a subset of adversarial techniques from the adversarial techniques, a subset of adversarial software from the adversarial software, a subset of adversarial groups from the adversarial groups, a subset of mitigation from the mitigations, a subset of telemetry collection from telemetry collections, and/or a subset of detection logic creations from the detection logic creations. Additionally, the empirical algorithms of the prioritizer 1226 can further calculate a minimum viable technique coverage to identify a minimal adversarial technique coverage to detect at least one technique leveraged by adversaries (e.g., adversarial technique, adversarial group, adversarial software) found in the threat intelligence. In some embodiments, the prioritizer 1226 can include threat exposure engine 106 and modeling engine 105 for generation of a prioritized exposure score 104.

In some implementations, the prioritizer 1226 can perform an adversarial technique prioritization algorithm to generate a priority score for an adversarial technique using:

Prevalence = (*ThreatIntelProvider1Prevalence* ∗ TI1_Weight) +

(*ThreatIntelProvider2Prevalence* ∗ TI2_Weight) + ...

PageRank = PageRank ∗ PR_Weight

MinimumHit = inMin*Hit*(0 or 1) ∗ MH_Weight

-continued

PrioritizationRaw = Prevalence + PageRank + MinimumHit

PrioritizationFinal = MinMax*Scaler*(PrioritizationRaw)

where prevalence represents a prevalence of the adversarial technique, threatIntelProvider1Prevalence represents a first prevalence score about a first threat intelligence source (e.g., FireEye™), TI1_Weight represents a first weight variable associated with the first threat intelligence source, ThreatIntelProvider2Prevalence represents a second prevalence score about a second threat intelligence source (e.g., Cybersecurity & Infrastructure Security Agency (CISA), TI2_Weight represents a second weight variable associated with the second threat intelligence source, PageRank represents a page rank, MinimumHit represents a minimum hitting set, inMinHit(0 or 1) represents whether the adversarial technique should be included in the minimum hitting set (i.e., MinimumHit), MH_Weight represents a weight variable of inMinHit(0 or 1), PrioritizationRaw is a value that is the sum of Prevalance, PageRank, and MinimumHit, MinMaxScaler normalizes PrioritizationRaw (e.g., to a value between 0 and 1), and PrioritizationFinal is an adversarial technique priority score.

Adversarial techniques can be organized according to priority score. In some implementations, a higher priority score and/or larger amount of priority indicates that an adversarial technique poses more risk/danger relative to a lower priority score and/or lower amount of priority. As a non-limiting example, output can be represented by a "Name" column listing adversarial techniques, a "Priority" column indicating a priority (i.e., priority score, adversarial technique priority score, PrioritizationFinal, etc.) of each adversarial technique, a "Coverage" column indicating how well an adversarial technique is detected with available/enabled detections (i.e., detection logics), a "Telemetry" column indicating the number of telemetry types present within the defended environment analyzed by the defense awareness and prioritization device 1210, a "Detections" column indicating the number of detections that are applied to the collected telemetry, and a "Mitigations" column indicating the number of mitigations that are currently in place. Note that, in some implementations, only the adversarial techniques with the highest priority scores (while omitting showing other adversarial techniques having lower priority scores); said similarly only a subset of adversarial techniques are shown from a larger set of adversarial techniques. In other implementations, however, all the adversarial techniques (without any omissions) could be shown.

In some instances, prevalence can additionally or alternatively be determined using:

$$p(\mathcal{J}, t) = \sum_{I_i \in \mathcal{J}} f(I_i, t) * W_i$$

and $$f(I, t) = \frac{\sum_{r_i \in I} \begin{cases} 1 & t \in r_{it} \\ 0 & t \notin r_{it} \end{cases}}{|I|},$$

where p=the prevalence of a given technique; t=a threat technique; $\mathcal{J}$=an arbitrary set of threat intel providers' data sets; I=a threat intel providers data set (these data sets are a set of threat reports r originating from a single threat intel provider); r=a threat report is an object that contains a set of techniques $r_t$, an attributed threat group $r_g$, a set of targeted industries $r_i$, a set of targeted countries $r_c$, and a set of utilized software $r_s$ (it is possible for one or more of its containing sets to be empty); f=the frequency of occurrence of a technique in a threat intel providers data set; W=a set of the same size of $\mathcal{I}$ where for each element $I_n$ in $\mathcal{I}$ there is an element $w_n$ in W that is greater than 0 and denotes the weight associated with that threat intel provider $I_n$ (the assigned weight can be based on several factors including timeliness, accuracy, and sample size).

In some implementations, the prioritizer 1226 can perform an adversarial group prioritization algorithm to generate an adversarial group score for an adversarial group using:

$$Prevalence = (ThreatIntelProvider1Prevalence * TI1\_Weight) +$$
$$(ThreatIntelProvider2Prevalence * TI2\_Weight) + \ldots$$
$$matchCountry = GroupTargetingCountry(0 \text{ or } 1) * C\_Weight$$
$$matchIndustry = GroupTargetingIndustry(0 \text{ or } 1) * I\_Weight$$
$$matchData = GroupTargetingData(0 \text{ or } 1) * D\_Weight$$
$$matchSize = GroupTargetingSize(0 \text{ or } 1) * S\_Weight$$
$$PrioritizationRaw =$$
$$Prevalence + matchCountry + matchIndustry + matchData + matchSize$$
$$PrioritizationFinal = MinMaxScaler(PrioritizationRaw)$$

where GroupTargetingCountry(0 or 1) represents if the adversarial group is targeting a country in which a given organization operates, C_Weight represents a weight variable of GroupTargetingCountry(0 or 1), GroupTargetingIndustry(0 or 1) represents if the adversarial threat group is targeting the industry or sector of the given organization (e.g., health care, financial, etc.), I-Weight represents a weight variable of Group TargetingIndustry(0 or 1), GroupTargetingData(0 or 1) represents if the type of data the adversarial group is target (e.g., PHI, PII, SSN, etc.) matches data used the given organization, D_Weight represents a weight variable of GroupTargetingData(0 or 1), GroupTargetingSize(0 or 1) represents if the adversarial group is targeting and/or has targeted other organizations with similar (e.g., within 5%, within 10%, within 25%, within 50%, etc.) size as the given organization, S_Weight represents a weight variable of GroupTargetingSize(0 or 1), PrioritizationRaw is a value that is the sum of Prevalence, matchCountry, matchIndustry, matchData, and matchSize, MinMaxScaler normalizes PrioritzationRaw (e.g., to a value between 0 and 1), and PrioritizationFinal is an adversarial group priority score.

Adversarial groups can be organized according to priority score. In some implementations, a higher priority score and/or larger amount of priority indicates that an adversarial group poses more risk/danger relative to a lower priority score and/or lower amount of priority. In some embodiments, the "Name" column lists adversarial groups, the "Priority" column indicates a priority (i.e., priority score, adversarial group score, PrioritizationFinal, etc.) of each adversarial group, the "Combined Coverage" column indicates how well an adversarial technique is detected with available/enabled detections, and the "Techniques" column indicates the number of techniques detected (e.g., by the defense awareness and prioritization device 1210) associated with (e.g., linked to, performed by, etc.) each adversarial group. Note that, in some implementations, only the adversarial groups with the highest priority scores are shown (while omitting showing other adversarial groups having lower priority scores); said similarly only a subset of adversarial groups are shown from a larger set of adversarial groups. In other implementations, however, all the adversarial groups (without any omissions) are shown.

In some implementations, the prioritizer 1226 can perform an adversarial software prioritization algorithm to generate an adversarial software score for an adversarial software using:

$$numGroups = NumGroupsUsingSoftware * N\_Weight$$
$$groupPriority = AvgPriorityOfGRoupsUsingSoftware * P\_Weight$$
$$PrioritizationRaw = numGroups + groupPriority$$
$$PrioritizationFinal = MinMaxScaler(PrioritizationRaw)$$

where NumGroupsUsingSoftware represents a number of groups using the adversarial software, N_Weight represents a weight variable of NumGroupsUsingSoftware, AvgPriorityOfGroupsUsingSoftware represents an average priority score of groups using the adversarial software, P_Weight represents a weight variable of AvgPriorityOfGroupsUsingSoftware, PrioritizationRaw is a value that is the sum of numGroups and groupPriority, MinMaxScaler normalizes PrioritzationRaw (e.g., to a value between 0 and 1), and PrioritizationFinal is an adversarial software priority score. Adversarial software can be organized according to priority score. In some implementations, a higher priority score and/or larger amount of priority indicates that an adversarial software poses more risk/danger relative to a lower priority score and/or lower amount of priority. A "Name" column can list adversarial software, the "Priority" column indicates a priority (i.e., priority score, adversarial software score, PrioritizationFinal, etc.) of each adversarial software, the "Combined Coverage" column indicates how well an adversarial technique is detected with available/enabled detections, and the "Techniques" column indicates the number of techniques detected (e.g., by the defense awareness and prioritization device 1210) associated with (e.g., linked to, performed by, performed using, etc.) each adversarial software. Note that, in some implementations, only the adversarial software with the highest priority scores are shown (while omitting showing other adversarial software having lower priority scores); said similarly only a subset of adversarial software are shown from a larger set of adversarial software. In other implementations, however, all the adversarial software (without any omissions) are shown.

Prioritization System

FIG. 12 is a schematic block diagram of an awareness and prioritization system 1200, according to an embodiment. The awareness and prioritization system 1200 includes a defense awareness and prioritization device 1210, a server device 1270, and a telemetry device 1280. The defense awareness and prioritization device 1210 can be operatively coupled, via a network 1250, to the server device 1270 and/or the telemetry device 1280. The devices of the awareness and prioritization system 1200 can facilitate storage, communication, and/or analysis of telemetry data, detection logics, adversarial techniques, adversarial software, mitigations, and/or the like, to improve situational awareness to telemetry data and/or detection logics and prioritize adversarial techniques, adversarial software, adversarial groups, and/or mitigations in a defense environment.

The defense awareness and prioritization device 1210 can be or include a hardware-based computing device(s) (e.g., a desktop computer, a laptop, and/or the like), a multimedia device(s) (e.g., a display, a smartphone, a tablet, a wearable device, and/or the like), and/or servers (e.g., high performance computing, high performance storage devices, high performance communication devices, and/or the like) that can receive, store, process, and/or display data (e.g., telemetry data, representations of detection logics, adversarial techniques, adversarial software, mitigations, adversarial groups, and/or the like). The defense awareness and prioritization device 1210 can automatically monitor and detect any changes and/or updates in telemetry data and/or detection logics (e.g., provided by the telemetry device 1280 and/or the server 1270). Moreover, the defense awareness and prioritization device 1210 can analyze the telemetry data and/or detection logics to prioritize adversarial techniques, adversarial software, adversarial groups, and/or mitigations in the defense environment 101 automatically and substantially at machine speed (e.g., within 100 milliseconds, 500 milliseconds, 1 second, 5 seconds, 10 seconds, 50 seconds, and/or the like).

The defense awareness and prioritization device 1210 includes a memory 1211, a communication interface 1212, and a processor 1214, and can optionally include a telemetry sensor 1213. The defense awareness and prioritization device 1210 can receive, via the network 1250, data (e.g., telemetry data, detection logics, and/or the like) from the telemetry device 1280, the server device 1270, and/or other compute devices inside or outside the defense environment 1201. In some instances, the data or a portion of the data can be detected at the telemetry sensor 1213. The data (received from the telemetry device 180 and/or the server device 1270, and/or detected at the telemetry sensor 1213) can be stored in the memory 1211 of the defense awareness and prioritization device 1210.

The defense awareness and prioritization device 1210 can optionally include a user interface (not shown; e.g., a graphical user interface, a monitor, a projector, and/or the like) to display information (e.g., a detection instance, a detection coverage, a change or update in telemetry data, a change or update in detection logics, and/or the like). The defense awareness and prioritization device 1210 can optionally include peripheral devices (e.g., a touch screen(s), a monitor, a projector, a mouse(s), a keyboard(s), a keypad(s), a stylus pen(s), and/or the like) to receive commands from a user of the defense awareness and prioritization device 1210 (e.g., to enable a mitigation with highest priority score).

The memory 1211 of the defense awareness and prioritization device 110 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The memory 1211 can store data (for processing by the processor 114 and or communicating by the communicator 113), and/or codes representing instruction to be processed by the processor 1214. The data can include, for example, telemetry data and/or detection logics received from the telemetry device 180 and/or the server device 1270, and/or detected at the telemetry sensor 113, and data generated by the defense awareness and prioritization device 110 during the operation of the defense awareness and prioritization device 1210.

The data can include, for example, telemetry, detection logic, and mitigation repository 1230, relationship repository 1232, adversarial techniques, adversarial groups (i.e., threat groups; adversaries), adversarial software, alerts (e.g., from tools that generate the alerts to provide detection efficacy and/or analyst performance metrics) and/or the like. For example, the data can additionally include temporary variables, return memory addresses, and/or the like, generated during the operation of the defense awareness and prioritization device 1210. The memory 1211 can also store, for example, one or more software modules and/or code that include instructions to cause the processor 1214 to perform one or more processes or functions (e.g., the baseline generator 1220, the relationship mapper 1222, the change detector 1224, and/or the prioritizer 1226).

The communication interface 1212 can be a hardware component of the defense awareness and prioritization device 1210 to facilitate data communication between the defense awareness and prioritization device 1210 and external devices (e.g., the compute device 1260, the server device 1270), internal components of the user compute device 1210 (e.g., the processor 1214, the memory 1211, etc.), and/or peripheral devices (not shown; e.g., a scanner(s), an external hard drive(s), and/or the like) operatively coupled to the defense awareness and prioritization device 1210. The communication interface 1212 can include, for example, a network interface card (NIC), a Wi-Fi™ board, a Bluetooth® board, an optical communication board, a universal serial bus (USB) board, and/or any other suitable wired and/or wireless communication interface. In some implementations, the communication interface 1212 can be configured to connect and facilitate reception and/or transmission of the data from/to the defense awareness and prioritization device 110 to the server device 1270 and/or the telemetry device, via the network 1250.

The telemetry sensor 1213 of the defense awareness and prioritization device 1210 can be or include software stored in the memory 1211 and executed in the processor 1214 and/or hardware components that can detect telemetry data and/or pull telemetry data (query-telemetry data using an application programming interface (API)) from the telemetry device 1280, the server device 1270, a security appliance(s), a data lake(s), a device(s) with security information and event management (SIEM) software, and a device(s) with endpoint detection and response (EDR) technology, cloud telemetry, and/or the like. The telemetry data received by the telemetry sensor 1213 from the data lake can indicate the presence and an abundance of a log type or event logs (e.g., a windows security event log). For example, a data lake containing Windows® security event logs with an event code of 4688 can indicate a presence of an operational telemetry data such as, for example, process launch log telemetry data. It is often possible to query a security appliance (e.g., the telemetry device 1280) through the API to determine availability of telemetry data for that security appliance. If the telemetry data is not available through the API, however, other methods can be used to obtain the telemetry data. For example, a user can manually enter telemetry data provided by a data source.

The processor 1214 can be, for example, a hardware based integrated circuit (IC) or any other suitable processing device configured to run or execute a set of instructions or a set of codes. For example, the processor 1214 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. In some instances, the processor 1214 can be operatively coupled to the memory 1211 through a system bus (for example, address bus, data bus, and/or control bus, not shown).

The processor 1214 includes a baseline generator 1220, a relationship mapper 1222, change detector 1224, and a prioritizer 1226. Each of the baseline generator 1220, the relationship mapper 1222, the change detector 1224, and the prioritizer 1226 can include hardware and/or software that collectively automate monitoring telemetry data and/or detection logics, automate identifying change to and/or update (for awareness) in the telemetry data, the detection logics and/or mitigations, and automate prioritizing adversarial techniques, adversarial software (e.g., used by adversarial groups to execute the adversarial techniques), adversarial groups, and/or mitigations (e.g., based on impact scores) in a technical fashion and substantially at machine speed. In some implementations, each of the baseline generator 1220, the relationship mapper 1222, the change detector 1224, and the prioritizer 1226 can include instructions and/or software stored/loaded in the memory 1211 and executed by the processor 1214. For example, a code to cause the baseline generator 1220 to generate the telemetry, detection logic, and mitigation repository 1230 can be stored in the memory 1211 and executed by the processor 1214. Alternatively, or in addition, in some implementations, each of the baseline generator 1220, the relationship mapper 1222, the change detector 1224, and the prioritizer 1226 can include electronic circuitry (e.g., an integrated circuit mounted on the processor 1214). For example, prioritizer 1226 can be implemented on an individual integrated circuit chip to determine a priority list of mitigations (e.g., mitigation actions to be taken to reduce risk from an adversary software).

The baseline generator 1220 can receive the telemetry data and/or the detection logics received from the telemetry device 1280 and/or the server device 1270, and/or detected at the telemetry sensor 1213 and stored in the memory 1211, and generate the telemetry, detection logic, and mitigation repository 1230. The telemetry, detection logic, and mitigation repository 1230 can be used to enhance an enterprise organization's situational awareness of the presence, change, and/or update of telemetry data and/or detection logic. Cyber security teams can map the telemetry, detection logic, and mitigation repository 130 to an adversarial technique framework(s) including, for example, a National Security Agency/Central Security Service Technical Cyber Threat Framework (NTCTF), a MITRER Adversarial Tactics, Techniques, Common Knowledge (ATT&CK®) framework, Lockheed Martin® Cyber Kill Chain, Diamond Model, and/or the like, to baseline the defended environment's ability to defend itself against prioritized adversarial techniques, adversarial software, and/or adversarial groups within the defense environment 1201. In some implementations, mapping the adversarial techniques, the adversarial software, and/or the adversarial groups to the adversarial technique framework(s) can involve searching information about and/or a representation(s) of the adversarial techniques, the adversarial software, and/or the adversarial group(s) in a library of the adversarial technique framework(s) and fetching information and/or instructions about the adversarial techniques, the adversarial software, and/or the adversarial groups.

Furthermore, in some instances, baseline generator 1220 can provide the ability to generate custom detection logics that can be used in a query(ies) from any telemetry data source (e.g., to produce an adversarial technique coverage mapped to MITRE® ATT&CK® and/or any threat framework). Furthermore, in some instances, the baseline generator 1220 can receive and store open-source detection logics that can also be queried (e.g., via an API) against any telemetry data sources (e.g., to produce an adversarial technique coverage mapped to MITRE® ATT&CK® and/or any threat framework). Once all telemetry data, detection logics, and mitigations mentioned above are identified and stored, the baseline generator 1220 can produce the telemetry, detection logic and mitigation repository 1230. In some embodiments, determination of detection coverage can involve using a rule-based equation (e.g., an empirical relationship), a user choice (e.g., a choice made by the user of the defense decision device), and a machine learning model (e.g., a trained neural network). In some implementations, the defense awareness and prioritization device 1210 can include a decision support logic and calculate an estimated detection coverage based on the telemetry data and the detection logics as described in U.S. Pat. No. 11,252, 188, filed on Mar. 10, 2021 and entitled "METHODS AND APPARATUS TO AUTOMATE CYBER DEFENSE DECISION PROCESS AND RESPONSE ACTIONS BY OPERATIONALIZING ADVERSARIAL TECHNIQUE FRAMEWORKS", which is incorporated herein in its entirety by this reference.

The relationship mapper 1222 can be used to identify and/or generate a set of relationships (e.g., including transitive relationships) between the telemetry data, the detection logics, the mitigations, the adversarial technique, the adversarial software, and/or adversarial groups. In one example, the set of relationships can include a first relationship between a first telemetry datum and a second telemetry datum. In another example, the set of relationships can include a second relationship between a detection logic and an adversarial technique. In yet another example, the set of relationships can include a third relationship between a mitigation, an adversarial software, and a telemetry datum. In yet another example, the set of relationships can include a fourth relationship between an adversarial group and an adversarial software leveraged by that adversarial group. In yet another example, the set of relationships can include a fifth relationship between the adversarial group and an adversarial technique used by that adversarial group.

With reference to FIG. 12, the set of relationships can be then stored as a relationship repository 1232 in the memory 1211. By identifying and/or generating the set of relationships, the defense awareness and prioritization device 1210 can provide organizations with a higher degree of awareness regarding the organization's defensive capabilities (e.g., to detect adversarial techniques outlined in MITRE® ATT&CK®). For example, instead of just understanding that an organization has (or does not) the ability to detect an adversarial use of a PowerShell technique, the relationship mapper 1222 of the defense awareness and prioritization device 1210 can provide a granular awareness of an organization's ability to detect the PowerShell technique. For example, the relationship mapper 1222 can identify how a specific adversarial group can use that PowerShell technique, the adversarial software that the adversarial group uses to execute the PowerShell technique, and mitigations that have been implemented in the past to eliminate/reduce execution of the adversarial software and/or the PowerShell technique within the defense environment 1201 (or a defense environment similar to defense environment 1201). In some implementations, the relationship mapper 1222 can identify and/or generate a set of relationships (e.g., including transitive relationships) between the telemetry data, the detection logics, the adversarial technique(s), the software leveraged by an adversary(ies), the adversarial group(s) and/or the mitigation(s) as described in U.S. Pat. No. 11,252,188, filed on Mar. 10, 2021 and entitled "METHODS AND APPARATUS TO AUTOMATE CYBER DEFENSE DECISION PROCESS AND RESPONSE ACTIONS BY OPERATIONALIZING ADVERSARIAL TECHNIQUE FRAMEWORKS", which is incorporated herein in its entirety by this reference.

The change detector 1224 can detect a change/update in telemetry data, detection logics, and/or mitigations. In some instances, for example, a data lake can be monitored via an application programming interface(s) (APIs) for new telemetry data (e.g., available for the security team to use). In some instances, cyber security products can be monitored via an API(s) for changes in configuration and/or new detection logics. In some instances, a status of a data source (e.g., the telemetry device 1280) can be monitored for being up or down via an automated ping check. In some instances, a third-party monitoring tool like, for example, Nagios® can be used to monitor the status of the data source. In some instances, for example, network traffic flow (e.g., of the network 1250) of the defense awareness and prioritization device 1210 can be continuously monitored to detect a change(s) or an update(s) in network traffic patterns in the network traffic flow. In some instances, for example, an access to classified information of the defense awareness and prioritization device 1210 and or one or more compute device within the defense environment 101 can be reported as telemetry data to the change detector 1224 of the defense awareness and prioritization device 1210, at discrete times (e.g., substantially immediately (e.g., 100 milliseconds, 1 second, etc.) after the classified information is accessed). In some instances, for example, the change detector 1224 can receive (e.g., from the server device 1270 and using the communication interface 1212) a notification of availability of an update in detection logics of a security fingerprints.

The prioritizer 1226 enhances the defense awareness and prioritization device's 1210 ability to focus on and prioritize adversarial techniques, adversarial software, adversarial groups, mitigations (e.g., to implement), telemetry data (e.g., to collect), and/or detection logics (e.g., to apply to telemetry data) that are most critical for defending the defense environment 1201. The prioritizer 1226 can receive threat data including a customer questionnaire(s), threat intelligence, weights of the threat intelligence, prevalence scores, and/or the like, and calculate, via empirical algorithms incorporating the threat data, a priority score for each adversarial technique, adversarial group, adversarial software, mitigation, telemetry collection, detection logics creation, and/or the like. The adversarial groups may leverage the adversarial software to perform the adversarial techniques, mitigations, telemetry collection and/or detection logics creation can be selected, prioritized, and/or caused to be performed based on the calculated priority scores for each adversarial group, adversarial software, adversarial technique, mitigation, telemetry collection, and/or detection logics creation. Additional details related to the empirical algorithms are discussed further below.

As shown in FIG. 12, the defense environment 1201 includes the defense awareness and prioritization device 1210. Therefore, the defense awareness and prioritization device 1210 can develop situational awareness to telemetry data, detection logics, and/or mitigations related to the defense awareness and prioritization device 1210 and prioritize adversarial techniques, adversarial software, and/or adversarial groups in response to cyber threats and changes to the defense posture of the defense awareness and prioritization device 1210. In some implementations, in addition to the defense awareness and prioritization device 1210, the defense environment 1201 can optionally include one or more compute devices (not shown; e.g., employee compute devices in an organization). In such implementations, the defense awareness and prioritization device 1210 can develop situational awareness to telemetry data, detection logics and/or mitigations related to the one or more compute devices and the defense awareness and prioritization device 1210, and prioritize adversarial techniques and/or adversarial software in response to cyber threats and changes to the defense posture of the one or more compute devices and the defense awareness and prioritization device 1210.

Although, the defense awareness and prioritization device 1210, the telemetry device 1280, and the server device 1270 of the defense awareness and prioritization system 1200 are shown and described as singular devices, it should be understood that, in some implementations, one or more defense awareness and prioritization devices, one or more telemetry devices, and one or more server devices can be used in the defense awareness and prioritization system 1200. For example, one or more telemetry devices of the defense awareness and prioritization system 100 can provide telemetry data to the defense awareness and prioritization device 1210. The defense awareness and prioritization device 1210 can maintain an awareness of the telemetry data provided by the one or more telemetry devices.

With reference to FIG. 12, the server device 1270 can include a compute device(s) particularly for data storage, communication, and/or processing, and can include, for example, a network of electronic memories, a network of magnetic memories, a server(s), a blade server(s), a storage area network(s), a network attached storage(s), and/or the like. The server device 1270 includes a memory 1271, a communication interface 1272 and a processor 1274, which can be structurally and/or functionally similar to the memory 1211, the communication interface 1212, and/or the processor 1214, respectively. The server device 1270 can optionally include a telemetry sensor 1273, which can be structurally and/or functionally similar to the telemetry sensor 1213. In some implementations, the server device 1270 can include and/or execute a cloud-based service such as, for example, a software as a service (SaaS), a platform as a service (PaaS), an infrastructure as a service (IaaS), and/or the like, to the defense awareness and prioritization device 1210 and optionally to one or more compute devices (not shown) inside the defense environment 101 and/or one or more compute devices (not shown) outside the defense environment.

The telemetry device 1280 can be or include an electronic device(s) (e.g., a sensor(s), a database(s), and/or the like) that can provide telemetry data to the defense awareness and prioritization device 1210. In some instances, the telemetry device 180 can be or include a security appliance(s), a data lake(s), a device(s) with security information and event management (SIEM) software, and a device(s) with endpoint detection and response (EDR) technology, and/or the like. The telemetry device 1280 can include a memory (not shown) that stores the telemetry data, a processor (not shown) that processes the telemetry data, and a communication interface (not shown) that receive/transmits the telemetry data to other device(s) such as the defense awareness and prioritization device 110.

Telemetry data as described above can include raw log data that can be used to identify adversarial techniques and/or adversarial software used by cyber adversaries, and/or to identify mitigations (e.g., mitigation plans) and/or used by a cyber security team. For example, the telemetry data can be, include, represent, and/or have information about extended detection and response (XDR) telemetry data, network events, network traffic flow, perimeter and/or lateral connections established, suspicious network traffic, security finger prints used, network connections, user account activity, executed commands in a processor, executed processes in a cloud, registry modifications, files accessed, email attachment types, user logins, and/or the like. The telemetry data can include, and the defense awareness and prioritization device 1210 can process, a combination of an identifier(s) (e.g., Microsoft Windows Sysmon/Operational Event), a primitive(s) (e.g., driver loaded), a subcategory(ies) (e.g., file context), a category(ies) (e.g., file), and/or the like to identify an adversarial technique outlined.

The network 1250 can be a digital telecommunication network of servers and/or compute devices. The servers and/or compute device(s) on the network 150 can be connected via a set of wired or wireless communication channels to share resources such as, for example, data, data storage, and/or computing power. The wired or wireless communication channels can include, for example, a radio frequency (RF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

In use, the baseline generator 1220 of the defense awareness and prioritization device 1210 can connect (e.g., via an API) to some or all cyber defense tools (e.g., the telemetry device 1280, a firewall, an endpoint detection and response (EDR), a cloud telemetry, an anti-virus (AV) software a data lake, an intrusion detection system (IDS), an intrusion prevention system (IPS), a network appliance, an endpoint protection platform (EPP), and/or the like) within or available to a defense environment, and can catalog all telemetry data, detection logics (also referred to as the "detection logic rules" or "detections") and/or mitigations provided by the cyber defense tools. Real time data or substantially real time data (e.g., telemetry data received from the server device 1270 and/or the telemetry device 1280) as received can be processed (e.g., mapped to a threat framework) by the defense awareness and prioritization device 1210 to deduce new information (e.g., adversarial techniques, adversarial software, and/or the like). The term "substantially" in this context is defined functionally where a time of receiving the telemetry data does not impact a detection coverage of the defense awareness and prioritization device 1210 at that time or after that time. For example, receiving telemetry data in substantially real time can allow for telemetry data to be received with a slight delay in milliseconds range, seconds range, or minutes range where such delay does not impact the detection coverage of the defense awareness and prioritization device 1210.

In some instances, the baseline generator 1220 can also receive the telemetry data and/or detection logics directly from a user(s) of the defense awareness and prioritization device 1210 or any other device in the defense awareness and prioritization system 1200. Once all telemetry data, detection logics, and/or mitigations are identified and received by the baseline generator 1220, the baseline generator can produce a baseline of telemetry data, detection logics, and mitigations (referred to as the "telemetry, detection logic, and mitigation repository 1230") that can be operated as a central repository for all detection logic in the defense environment 1201. Moreover, the telemetry, detection logic, and mitigation repository 1230 can be then easily processed such as, for example, sorted, searched, enabled/disabled, revision controlled, version controlled, and/or mapped to any threat framework (e.g., NTCTF, MITRER ATT&CK®, etc.). Therefore, the defense awareness and prioritization device 1210 can compare the previously- and locally-stored telemetry data, detection logic, and mitigation (in the telemetry, detection logic, and mitigation repository 1230) with future telemetry data, future detection logics, and/or future mitigations to detect an update and/or change in the telemetry data, the detection logic, and/or mitigations related to the defense environment 1201 effectively and efficiently.

As described above, the relationship mapper 1222 can be used to identify and/or generate the set of relationships between the telemetry data, the detection logics, the adversarial techniques, the adversarial software, the adversarial groups, and/or the mitigations and produce the relationship repository 1232. Once the telemetry, detection logic, and mitigation repository 1230 and the relationship repository 1232 are established (by cataloging some or all of the available telemetry data, detection logics and/or mitigations, and once some or all transitive relationships are mapped between the telemetry data, the detection logics, the adversarial techniques, the adversarial software, and/or the mitigations) the change detector 1224 can monitor (e.g., continuously, discretely and at a preset monitoring frequency, etc.) the telemetry, detection logic, and mitigation repository 130 and/or the relationship repository 1232 for any change or update.

When a change or update in the telemetry, detection logic, and mitigation repository 130 and/or the relationship repository 1232 is detected, the defense awareness and prioritization device 1210 can send an alert to the user(s) of the defense awareness and prioritization device 1210. Sensitivity to any changes and/or updates in the available telemetry data, detection logic, mitigation and/or relationship stored in the telemetry, detection logic, and mitigation repository 1230 and/or the relationship repository 1232 can provide real-time or substantially real-time enterprise situational awareness of availability and/or changes to telemetry data, detection logics, mitigations, and/or relationships. In some instances, a detection sensitivity of the change detector 1224 to the changes and/or updates can be selected by a user of the defense awareness and prioritization device 110. In one example, the user can increase the detection sensitivity of the change detector 124 such that the change detector 1224 can record and timestamp connection of every device and/or every network event in the defense environment 1210. In another example, the user can decrease the detection sensitivity of the change detector 1224 such that only changes or updates that have a history of an adversarial cyber action, according to a threat framework, can be detected. Furthermore, the change detector 1224 can also monitor the correct (or desired) operational functioning of telemetry sources (e.g., the telemetry device 1280), and can notify (via a pop-up window, an email, a phone call, a text message, and/or the like) the user(s) of any discovered operational error in the telemetry sources that could impact the organization's ability to detect and/or respond to adversarial activity within the defense environment 1201.

In a busy defense environment, it can be challenging for the user of the defense awareness and prioritization device 1210 to manually analyze and prioritize a set of adversarial techniques, a set of adversarial software, a set of adversarial groups, a set of telemetry categories (e.g., that can be collected to increase an impact score), a set of detections (e.g., that can be created or enabled to increase an impact score) and/or a set of mitigations related to changes and/or updates to the telemetry data, detection logics, or mitigations detected by the change detector 1224 (e.g., that can be implemented to increase an impact score). Therefore, the prioritizer 1226 can be configured to automatically, and at machine speed, analyze and prioritize the set of adversarial techniques, the set of adversarial software, the set of adversarial groups, the set of telemetry categories, the set of detections, and/or the set of mitigations. The prioritizer 1226 can receive threat data, including a customer questionnaire(s), threat intelligence, weights of the threat intelligence, prevalence scores, and/or the like, for analyzing and prioritizing the set of adversarial techniques, the set of adversarial software, the set of adversarial groups, and/or the set of mitigations. In some instances, the customer questionnaire(s) can include information about the organization such as, for example, a type(s) of data that the organization protects, a size of the organization, the industry sector of the organization, a geolocation of the organization, and/or the like. For example, the type(s) of data that the organization protects can include personally-identifying information (PII) data type, payment card industry (PCI) data type, protected health information (PHI) data type, proprietary information data type, industry secret data type, attorney-client privileged information data type, national security data type, controlled unclassified information (CUI), export controlled research data type, sensitive identifiable human subject research data, and/or the like. A size of the organization can be or include an integer number associated with number of employees of the organization, a real number associated with revenue of the organization, a real number associated with a data security budget of the organization, and/or the like. The sector of the organization can be or include, for example, information technology sector, a health care sector, a financial sector, a consumer discretionary sector, a communication service sector, a semiconductor industry sector, an energy sector, a real estate sector, a legal sector, and/or a defense industry sector. The geolocation of the organization can be or include, for example, global positioning system (GPS) coordinates, a city indicator, a state indicator, a country indicator, a region indicator, a county indicator, and/or the like. The threat data can also include an indication of prevalence, which can indicate how often an adversarial technique, adversarial software, and/or adversarial group is observed in an environment(s) (e.g., network(s), compute device(s), application(s), etc.). The threat data can also include, for example, an indication of page rank, which can indicate an importance of each node in a graph, where (1) graphs include nodes, edges, and edge weights, (2) nodes are objects (e.g., technique, software, threat group), (3) edges are objects (e.g., technique, software, threat group) that co-occur with the nodes, and (4) edge weights are the co-occurrence percentage (e.g., co-occurrence percentage=number of times a first object is seen with a second object/total number of times the first object and second object are seen). The threat data can also include an indication of a minimum hitting set, which can indicate the smallest possible list of techniques that encompasses at least one technique out of every observed adversarial campaign.

Machine Learning Models

In some implementations, the processor 1214 of the defense awareness and prioritization device 1210 can include a machine learning model (not shown). In some configurations, the machine learning model can be software implemented as a set of codes stored at and executed by the defense awareness and prioritization device 1210. In some configurations, the machine learning model can be hardware implemented as an integrated circuit (IC) that is executed by the defense awareness and prioritization device 1210. The machine learning model can be trained during a training phase and executed during an execution phase.

During the training phase, the machine learning model (not shown) can receive training data including (1) historical telemetry data, (2) historical detection instances, and (3) historical set of adversarial techniques. The term "historical" here refers to past (e.g., past week, past month, past year, and/or the like). For example, the historical telemetry data, the historical detection instances, and the historical set of adversarial techniques can refer to telemetry data, detection instances, and set of adversarial techniques that were collected previously (e.g., during past week, during past year, and/or the like). The historical telemetry data were used or can be used to detect the set of historical adversarial techniques in a set of environments. The set of environments (also "the set of defense environments") can include a variation of a set of individual compute devices, a variation of a set of compute systems, a variation of a set of operatively coupled compute devices in a local area networks (LAN), and/or the like. Each environment from the set of environments can have its own set of attributes such as an association(s) to an organization(s), an operating system(s) of the environments, a decision support logic(s), a telemetry sensor type(s), a connectivity attribute(s), and/or the like. Historical detection instances were queried or can be queried against the historical telemetry data to detect the historical set of adversarial techniques in the set of environments. The training data can be divided to a training set and a testing set by a ratio (e.g., 80% training set and 20% testing set). Each of the training set and the testing set can be divided into batches of data and be interactively and/or randomly used to optimize/improve a set of model parameters of the machine learning model against an objective function. The set of model parameters of the machine learning model can include for example, a set of arithmetic and/or a set of logical variables that can be tuned to adjust an output of the machine learning model. The objective function can be for example, a root mean squared error (RMSE)-based function of occurrences of the set of adversarial techniques and/or confidence scores for the occurrences of the set of adversarial techniques. Once trained, the trained machine learning model can be executed to predict an occurrence of an adversarial technique and a confidence score for the occurrence of the adversarial technique.

During the execution phase, the trained machine learning model (not shown) can receive, from an environment, (1) telemetry data not included within the historical telemetry data or (2) at least one detection instance not included within the historical detection instances. In some instances, the environment can be the same as any of environment from the set of environments. For example, a first environment can have the exact same attributes as an environment from the set of environments. The first environment and the environment from the set of environments can both, for example, have an association to a government organization (resulting in being prone to cyber-attack), include an Ubuntu™ Linux-based operating system running, and/or be connected to the Internet via a fifth generation (5G) network. In some instances, the environment can be similar to any environment from the set of environments. Here, a similarity between environments can depend on similarity between technologies used in the environments and/or similarity between attributes in the environments. In another example, relative to the above example, a second environment can have similar attributes to the environment from the set of environments. The second environment can have, for example, an association to an international organization (resulting in being prone to cyber-attack), have a Redhat™ Linux-based operating system, and/or be connected to the Internet via a WiFi™ network. In yet another example, relative to the examples above, a third environment can have different ('not similar') attributes compared to environment from the set of environments. The second environment can have, for example, an association to a hospital (resulting in being less prone to cyber-attack), have an android-based operating system (significantly different from Linux operating systems), not connected to the Internet (on a local area network). The trained machine learning model can be executed by the processor 114 based on the telemetry data and the at least one detection instance to predict an occurrence of an adversarial technique and a confidence score (e.g., 85% confidence score, 98% confidence score, and/or the like) for the occurrence of the adversarial technique.

The trained machine learning model, in some implementations, can be trained and configured to predict an attack chain response action. For example, the trained machine learning model can predict an adversary attack chain that includes a first adversarial technique and a second adversarial technique that is predicted to occur subsequent to the first adversarial technique. The trained machine learning model can also predict an attack chain response action to prevent the second adversarial technique after the occurrence of the first adversarial technique and before an occurrence of the second adversarial technique. For example, the machine learning model can be a neural network that is trained on time series of adversarial techniques and/or attack chain response actions. The trained machine learning model can, therefore, receive a first time series data and generate a second time series data based on the first time series data. For example, the trained machine learning model can be configured to receive an occurrence of a first set of timestamped adversarial techniques (e.g., detected by telemetry sensor(s)) and predict an occurrence of a second set of timestamped adversarial techniques and/or a set of timestamped attack chain response actions based on the first set of timestamped adversarial techniques. Thus, the trained machine learning model can analyze adversarial techniques and generate appropriate response actions in response to the adversarial techniques in substantially real-time (e.g., 100 milliseconds, 500 milliseconds, 1 second, 5 seconds, 10 seconds, 50 seconds, 100 seconds, 500 seconds, and/or the like).

Interfaces for Presentation of Data

In some implementations, the priority scores of one or more threats, mitigations (if implemented), one or more telemetry types (if collected), and one or more detection logics (if created), can be output and sorted (e.g., from largest positive impact to smallest positive impact, from smallest positive impact to largest positive impact, top ten impact scores, randomly, etc.) (e.g., priority list 1310, discussed herein). "Progress" indicators which can indicate progress for implementing a mitigation, collecting a telemetry type, and/or creating/enabling a detection logic can also be presented.

In some implementations, a user can be made aware of any changes to mitigations, telemetry collection, and/or detection logic affecting an organization's threat centric security posture (e.g., via a display) within a common display (e.g., dashboard). For example, an activity feed including various changes in mitigations (e.g., "Admin set mitigation Patch operating systems status to completed"), telemetry collection (e.g., "Admin added Tag Site 2 to source Elastic Security"), and detection logic creation (e.g., "Interpres identified detection Test Rule 3.0 enabled on source Elastic Security").

In some implementations, a user can view a dashboard showing additional details related to mitigations (e.g., via a display). For example, a dashboard outlining "Essential Mitigations", "Recently Updated", and "Prioritized Techniques". "Essential Mitigations" lists multiple essential mitigations (e.g., highest mitigation impact scores), a status of each mitigation, an effectiveness of each mitigation, and number of adversarial techniques that would be mitigated using each mitigation. "Recently Updated" lists multiple mitigations based on when that mitigation was updated, a status of each mitigation, an effectiveness of each mitigation, and a number of adversarial techniques that would be mitigation using each mitigation. "Prioritized Techniques" outlines multiple adversarial techniques (e.g., defense evasion, discovery, execution, command and control, collection, persistence, credential access, privilege escalation, initial access, lateral movement, exfiltration, impact), where each adversarial technique is associated with a map made up of shapes having a color and size. The color can indicate the number of mitigations, and the size can indicate priority (e.g., bigger sizing indicating higher priority). In some implementations, maps shown can be shown to/seen by an analyst (e.g., cyber security analyst, e.g., via a display) to quickly gauge mitigations for various adversarial techniques.

In some implementations, a user can view a dashboard showing additional details related to telemetry data (e.g., via a display). For example, a dashboard outlining "Top Telemetry", "Underutilized Telemetry", and "Technique Telemetry Coverage". "Top Telemetry" lists top telemetries (e.g., in order based on number of adversarial techniques monitored by the telemetry type), a category(ies) associated with each telemetry (e.g., command, process, file, network traffic, windows registry, module, logon session, script, etc.), sources for the telemetry (e.g., Elastic Security®, CrowdStrike®, EvalCB®, etc.), a number of adversarial techniques monitored by the telemetry type. "Underutilized Telemetry" lists multiple telemetries that are underutilized (e.g., not collected, but has large telemetry collection impact score), a category(ies) for each telemetry, and a source(s) for each telemetry. "Technique Telemetry Coverage" outlines multiple adversarial techniques (e.g., defense evasion, discovery, persistence, execution, command and control, privilege escalation, credential access, collection, initial access, lateral movement, impact, exfiltration), where each adversarial technique is associated with a map made up of shapes having a color and size. The color can indicate the number of available telemetry types, and the size can indicate the priority. In some implementations, maps can be shown to/seen by an analyst (e.g., via a display) to quickly gauge telemetry coverage for various adversarial techniques. For example, a cyber security analyst may view the maps and decide to focus on large white boxes first, where the box being white indicates that zero telemetry types are available, and the box being large indicates a high priority.

In some implementations, a user can view a dashboard showing additional details related to detections (e.g., via a display). For example, a dashboard outlining "Top Detections—By Alerts", "Recently Updated", and "Number of Detections". "Top Detections—By Alerts" lists top detections based on alerts (where alerts are generated to provide detection efficacy and/or analyst performance metrics), a severity of each detection, a status of each detection, and an indicator of the number of alerts generated by the detection logic. "Recently Updated" lists multiple detection logics, a severity of each detection logic, and a modified timestamp indicating when a detection logic was updated. "Number of Detections" outlines multiple adversarial techniques (e.g., defense evasion, discovery, persistence, execution, command and control, privilege escalation, credential access, collection, initial access, lateral movement, impact, exfiltration), where each adversarial technique is associated with a map made up of shapes having a color and size. The color can indicate coverage, and the size can indicate prevalence among malware. In some implementations, maps can be shown to/seen by an analyst (e.g., via a display) to quickly gauge telemetry coverage for various adversarial techniques.

In some instances, the displayed outputs can help to improve a user and/or compute device's ability to convey information in an efficient manner, such as using a compute device with a smaller screen and/or lower computing power. For example, cybersecurity data that is to be analyzed (e.g., telemetry data, detection logics, mitigations, adversarial techniques, adversarial software, adversarial groups, and/or the like) can sometimes be associated with a massive amount of data. One or more implementations recite improvements over known systems, resulting in an improved user interface for compute devices (e.g., defense awareness and prioritization device 1210, and/or a compute device not shown in FIG. 12). For example, some implementations are related to presenting a limited amount of information (e.g., only action with largest positive impact, top telemetry, top detections by alerts, etc.) determined based on the set of data to be analyzed. Some implementations were related to determining and/or causing display of the limited set of information. Such a limited set of information can be advantageous in some cases. For example, a user (e.g., cybersecurity analyst) may not be able to view the entire set of data to be analyzed using a compute device with a smaller screen, lesser processing power, lesser memory, and/or the like, but may be able to view the limited set of information using that compute device. As such, a user's efficiency and the compute device's efficiency can be improved (e.g., in analyzing the set of data to be analyzed). As an illustration, the unpredictable nature of cybersecurity breaches may force cybersecurity analysts to monitor for cybersecurity health and/or analyze potential breaches at irregular hours and/or locations, where the analysts might not always have access to their larger-screen computers, but would very likely have access to their smaller-screen devices (e.g., phone).

Systems and Environments for Prioritization and Mitigation Management

FIG. 13 shows a block diagram of a prioritization system 1300 and computer environment 1360, according to an embodiment. The prioritization system 1300 can be communicably coupled to the computer environment 1360 via a network 1350.

The network 1350 can be a digital telecommunication network of servers and/or compute devices. The servers and/or computes device on the network 1350 can be connected via a set of wired or wireless communication channels to share resources such as, for example, data, data storage, and/or computing power. The wired or wireless communication channels can include, for example, a radio frequency (RF) communication channel(s), a fiber optic commination channel(s), an electronic communication channel(s), a satellite communication channel(s), and/or the like. The network 1350 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

The computer environment 1360 can include any number of compute devices, such as compute device 1361, compute device 1362, and/or compute device 1363. Each of compute devices 1361, 1362, 1363 can include a processor and a memory (not shown) operatively coupled to the processor. The computer environment 1360 may include a collection of computer machinery, data storage devices, workstations, software applications, and/or networks that support the processing and exchange of electronic information demanded by a software solution(s). In some implementations, the computer environment 1360 may desire to ensure security within the environment, and implement one or more cyber defense tools (e.g., endpoint detection and response, intrusion detection system, intrusion prevention system, network appliance, data lake, security information and event management system, cloud telemetry, etc.). The one or more cyber defense tools may include/use/collect, for example, mitigations, telemetry data, and/or detection logics. In some implementations, compute devices 1361, 1362, and/or 1363 can display (and/or cause display at another device) screens.

The prioritization system 1300 can include a processor 1301 and memory 1302 operatively coupled to the processor 1301 (e.g., via a system bus). The processor 1301 can be, for example, a hardware based integrated circuit (IC) or any other suitable processing device configured to run or execute a set of instructions or a set of codes. For example, the processor 1301 can include a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. In some instances, the processor 1301 can be operatively coupled to the memory 1302 through a system bus (for example, address bus, data bus, and/or control bus, not shown).

The memory 1302 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The memory 1302 can store data (for processing by the processor 1301), and/or codes representing instructions to be processed by the processor 1301. The memory 1302 can include representations of implemented mitigations 1303, collected telemetry data 1304, applied detection logics 1305, unimplemented mitigations 1306, uncollected telemetry data 1307, unapplied detection logics 1308, impact scores 1309, and a priority list 1310.

The unimplemented mitigations 1306 can include representations of mitigation techniques that are not being applied at the computer environment 1360. The uncollected telemetry data 1307 can include representations of telemetry data that is not being collected at the computer environment 1360. The unapplied detection logics 1308 can include representations of detection logics that are not being applied at the computer environment 1360.

The impact scores 1309 can include an impact score(s) representing impact of applying a mitigation and/or multiple mitigations from the unimplemented mitigations 1306 at the computer environment 1360 (e.g., to reduce a risk posed by an adversarial technique, adversarial software, and/or adversarial group). In some implementations, the impact scores 1309 includes an impact score for each unimplemented mitigation from the unimplemented mitigations 1306 and/or for each mitigation from the implemented mitigations 803. For example, each unimplemented mitigation from unimplemented mitigations 806 can be associated with an impact score representing impact of that unimplemented mitigation in reducing a risk at the computer environment 1360.

Additionally or alternatively, the priority scores 1309 can include an impact score(s) representing impact of collecting telemetry data from the uncollected telemetry data 807 at the computer environment 1360 (e.g., to reduce a risk posed by an adversarial technique, adversarial software, and/or adversarial group). In some implementations, the impact scores 809 includes an impact score for each telemetry data from the uncollected telemetry data 807 and/or each telemetry data from the collected telemetry data 1304. For example, each unimplemented telemetry data from uncollected telemetry data 1307 can be associated with an impact score representing impact of that telemetry data in reducing a risk at the computer environment 1360.

Additionally or alternatively, the priority scores 1309 can include an impact score(s) representing impact of applying detection logic from the unapplied detection logics 1308 at the computer environment 1360 (e.g., to reduce a risk posed by an adversarial technique, adversarial software, and/or adversarial group). In some implementations, the priority scores 1309 includes an impact score for each detection logic from the unapplied detection logics 1308 and/or each detection logic from the applied detection logics 1305. For example, each unapplied detection logic from unapplied detection logics 1308 can be associated with an impact score representing impact of that detection logics in reducing a risk at the computer environment 1360.

In some implementations, the computer environment 1360 is associated with (e.g., owned by, used by, etc.) an organization, and "Technique Priority", "Technique Coverage", and/or "Relationship Score" used for calculating an impact score in impact scores 1309 can be determined based on characteristics of the organization, such as a type of data protected by the organization, a size of the organization, an industry sector of the organization, a geolocation of the organization, and/or the like.

The priority list 1310 can include representations of one or more unimplemented mitigations from the unimplemented mitigations 1306, one or more uncollected telemetry data sets from the uncollected telemetry data 1307, and/or one or more unapplied detection logic from unapplied detection logics 1308 in a prioritized manner. For example, the priority list 1310 can include representations of one or more unimplemented mitigations from the unimplemented mitigations 1306, one or more uncollected telemetry data sets from the uncollected telemetry data 1307, and/or one or more unapplied detection logic from unapplied detection logics 1308 in order from largest impact score to smallest impact score. As another example, the priority list 1310 can include representations of one or more unimplemented mitigations from the unimplemented mitigations 1306, one or more uncollected telemetry data sets from the uncollected telemetry data 1307, and/or one or more unapplied detection logic from unapplied detection logics 1308 having impact score greater than a predetermined threshold.

In some implementations, impact scores 1309 can be calculated for each of implemented mitigations 1303, unimplemented mitigations 1306, collected telemetry data 804, uncollected telemetry data 1307, applied detection logics 1305, and unapplied detection logics 808, and the priority list 1310 can be generated based on the impacts scores for the implemented mitigations 1303, unimplemented mitigations 1306, collected telemetry data 804, uncollected telemetry data 1307, applied detection logics 1305, and unapplied detection logics 808. Thus, the priority list 1310 and/or impact scores 1309 can include (1) only unimplemented mitigations 1306, uncollected telemetry data 1307, and unapplied detection logics 1308, (2) only implemented mitigations 1303, collected telemetry data 1304, and applied detection logics 1305, or (3) a combination of both (1) and (2).

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood such methods can be computer implemented methods (e.g., instructions stored in memory and executed on processors). Where methods described above indicate certain events occurring in certain order, the ordering of certain events can be modified. Additionally, certain events can be performed repeatedly, concurrently in a parallel process when possible, as well as performed sequentially as described above. Furthermore, certain embodiments can omit one or more described events.

Some embodiments described herein relate to a computer storage product with a non-transitory computer-readable medium (also can be referred to as a non-transitory processor-readable medium) containing instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In order to address various issues and advance the art, the entirety of this application (including the Cover Page, Title, Headings, Background, Summary, Brief Description of the Drawings, Detailed Description, Claims, Abstract, Figures, Appendices, and otherwise) shows, by way of illustration, various embodiments in which the claimed innovations can be practiced. The advantages and features of the application are of a representative sample of embodiments only and are not exhaustive and/or exclusive. They are presented to assist in understanding the claimed principles.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features.

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

The invention claimed is:

1. A method for determining a defense surface change command to be applied to a defense surface, the method comprising:
   storing threat information for a set of known threats in an adversarial technique framework data structure, wherein the stored threat information comprises one or more of adversarial tactics, techniques, and procedure information;
   storing an organizational threat profile, the threat profile comprising information about networked components forming part of a network infrastructure, and wherein the networked components comprise one or more hardware or software components for monitoring a security state on a computer network;
   generating baseline exposure scores for the set of known threats;
   weighting the baseline exposure scores for the set of known threats based on at least the organizational threat profile to generate a prioritized exposure score for the threats in the set of known threats;
   determining one or more defense surface change commands based on at least the prioritized exposure scores for the threats in the set of known threats;
   transmitting the one or more defense surface change commands to the one or more hardware or software components based on the prioritized exposure scores for the threats in the set of known threats;
   receiving confirmation of a defense surface change at the one or more hardware or software components in response to the one or more defense surface change commands, wherein the confirmation includes telemetry data representing the implemented changes and triggers a real-time adjustment to the prioritized exposure scores; and generating an updated prioritized exposure score for the one or more of the known threats by correlating the telemetry data with historical threat information and current organizational threat profiles to dynamically refine the prioritized exposure scores.

2. The method of claim 1, further comprising:
training a machine learning model based on a set of historical telemetry data received from the networked components and a set of historical threat information;
receiving subsequent telemetry data from the networked components and subsequent threat information; and
executing the machine learning model based on the subsequent telemetry data and the subsequent threat information to predict an occurrence of a subsequent threat and a prioritized exposure score for the subsequent threat.

3. The method of claim 1, wherein generating the prioritized exposure score further comprises:
receiving the organizational threat profile;
generating a prioritized threat model score;
generating a prioritized defense surface score;
generating a prioritized fleet exposure score;
receiving the prioritized threat model score, the prioritized defense surface score, and the prioritized fleet exposure score as inputs to a modeling engine;
applying one or more weighting factors to one or more of the inputs to the modeling engine; and
generating by the modeling engine the prioritized exposure score based on one or more of the inputs to the modeling engine.

4. The method of claim 3, further comprising generating the prioritized defense surface score based on one or more terrain parameters selected from one or more of: a toolset configuration, a security log, an implemented detection logic, a security control or policy, and available detection logic.

5. The method of claim 1, wherein determining one or more defense surface change commands further comprises:
storing a set of defense surface change commands mapped for association with the set of known threats and a set of telemetry data;
mapping the stored threat information for the set of known threats against a set of received telemetry data to identify one or more security coverage gaps; and
determining the one or more defense surface change commands based on the one or more identified security coverage gaps.

6. The method of claim 1, further comprising generating the organizational threat profile based on one or more of: a relevance to an organization, an ability of a threat to be used within an organization environment, a country in which the organization operates, an industry in which the organization operates, a number of employees in the organization, a defense surface platform within a defended environment at the organization, and a type of data managed by the organization.

7. The method of claim 1, further comprising receiving a set of telemetry data from one or more networked components forming part of a network infrastructure, wherein the telemetry data comprises one or more sets of log data and configuration data.

8. The method of claim 1, wherein the baseline exposure scores apply to multiple enterprises and further comprising generating the baseline exposure scores based on one or more of a prevalence, impact, usability, and actionability value.

9. A system for determining a defense surface change command to be applied to a defense surface, the system comprising:
a computerized data store configured for storing threat information for a set of known threats in an adversarial technique framework data structure, wherein the stored threat information comprises one or more of adversarial tactics, techniques, and procedure information;
the computerized data store further configured for storing an organizational threat profile, the threat profile comprising information about networked components forming part of a network infrastructure, and wherein the networked components comprise one or more hardware or software components for monitoring a security state on a computer network;
a computerized processor configured for:
generating baseline exposure scores for the set of known threats;
weighting the baseline exposure scores for the set of known threats based on at least the organizational threat profile to generate a prioritized exposure score for the threats in the set of known threats;
determining one or more defense surface change commands based on at least the prioritized exposure scores for the threats in the set of known threats;
transmitting the one or more defense surface change commands to the one or more hardware or software components based on the prioritized exposure scores for the threats in the set of known threats;
receiving confirmation of a defense surface change at the one or more hardware or software components in response to the one or more defense surface change commands, wherein the confirmation includes telemetry data reflecting a status change and triggers an automated adjustment to the prioritized exposure scores; and
generating an updated prioritized exposure score for the one or more of the known threats by correlating the telemetry data with historical threat information to refine exposure prioritization.

10. The system of claim 9, wherein the computerized processor is further configured for:
training a machine learning model based on a set of historical telemetry data received from the networked components and a set of historical threat information;
receiving subsequent telemetry data from the networked components and subsequent threat information; and
executing the machine learning model based on the subsequent telemetry data and the subsequent threat information to predict an occurrence of a subsequent threat and a prioritized exposure score for the subsequent threat.

11. The system of claim 9, wherein the computerized processor is further configured for:
receiving the organizational threat profile;
generating a prioritized threat model score;
generating a prioritized defense surface score;
generating a prioritized fleet exposure score;
receiving the prioritized threat model score, the prioritized defense surface score, and the prioritized fleet exposure score as inputs to a modeling engine;

applying one or more weighting factors to one or more of the inputs to the modeling engine; and generating by the modeling engine the prioritized exposure score based on one or more of the inputs to the modeling engine.

12. The system of claim 11, wherein the computerized processor is further configured for generating the prioritized defense surface score based on one or more terrain parameters selected from one or more of: a toolset configuration, a security log, an implemented detection logic, a security control or policy, and available detection logic.

13. The system of claim 9, wherein the computerized processor is further configured for:
   storing a set of defense surface change commands mapped for association with the set of known threats and a set of telemetry data;
   mapping the stored threat information for the set of known threats against a set of received telemetry data to identify one or more security coverage gaps; and
   determining the one or more defense surface change commands based on the one or more identified security coverage gaps.

14. The system of claim 9, wherein the computerized processor is further configured for generating the organizational threat profile based on one or more of: a relevance to an organization, an ability of a threat to be used within an organization environment, a country in which the organization operates, an industry in which the organization operates, a number of employees in the organization, a defense surface platform within a defended environment at the organization, and a type of data managed by the organization.

15. A non-transitory processor-readable medium storing code representing instructions to be executed by a processor at a compute device for determining a defense surface change command to be applied to a defense surface, the code further comprising commands for:
   storing threat information for a set of known threats in an adversarial technique framework data structure, wherein the stored threat information comprises one or more of adversarial tactics, techniques, and procedure information;
   storing an organizational threat profile, the threat profile comprising information about networked components forming part of a network infrastructure, and wherein the networked components comprise one or more hardware or software components for monitoring a security state on a computer network;
   generating baseline exposure scores for the set of known threats;
   weighting the baseline exposure scores for the set of known threats based on at least the organizational threat profile to generate a prioritized exposure score for the threats in the set of known threats;
   determining one or more defense surface change commands based on at least the prioritized exposure scores for the threats in the set of known threats;
   transmitting the one or more defense surface change commands to the one or more hardware or software components based on the prioritized exposure scores for the threats in the set of known threats;
   receiving confirmation of a defense surface change at the one or more hardware or software components in response to the one or more defense surface change commands, wherein the confirmation includes telemetry data representing the implemented changes and is used to dynamically update the prioritized exposure scores; and
   generating an updated prioritized exposure score by adjusting the prioritized exposure scores based on a real-time correlation of the telemetry data with current organizational threat profiles.

16. The processor-readable medium of claim 15, further comprising commands for:
   training a machine learning model based on a set of historical telemetry data received from the networked components and a set of historical threat information;
   receiving subsequent telemetry data from the networked components and subsequent threat information; and
   executing the machine learning model based on the subsequent telemetry data and the subsequent threat information to predict an occurrence of a subsequent threat and a prioritized exposure score for the subsequent threat.

17. The processor-readable medium of claim 15, further comprising instructions for:
   receiving the organizational threat profile;
   generating a prioritized threat model score;
   generating a prioritized defense surface score;
   generating a prioritized fleet exposure score;
   receiving the prioritized threat model score, the prioritized defense surface score, and the prioritized fleet exposure score as inputs to a modeling engine;
   applying one or more weighting factors to one or more of the inputs to the modeling engine; and
   generating by the modeling engine the prioritized exposure score based on one or more of the inputs to the modeling engine.

18. The processor-readable medium of claim 15, further comprising instructions for:
   storing a set of defense surface change commands mapped for association with the set of known threats and a set of telemetry data;
   mapping the stored threat information for the set of known threats against a set of received telemetry data to identify one or more security coverage gaps; and
   determining the one or more defense surface change commands based on the one or more identified security coverage gaps.

19. The processor-readable medium of claim 15, further comprising instructions for generating the organizational threat profile based on one or more of: a relevance to an organization, an ability of a threat to be used within an organization environment, a country in which the organization operates, an industry in which the organization operates, a number of employees in the organization, a defense surface platform within a defended environment at the organization, and a type of data managed by the organization.

20. The processor-readable medium of claim 15, further comprising instructions for receiving a set of telemetry data from one or more networked components forming part of a network infrastructure, wherein the telemetry data comprises one or more sets of log data and configuration data.

* * * * *